(12) United States Patent
Metzgen

(10) Patent No.: US 8,589,464 B1
(45) Date of Patent: Nov. 19, 2013

(54) ARITHMETIC LOGIC UNIT

(75) Inventor: Paul J. Metzgen, London (GB)

(73) Assignee: Altera Corporation, San Jose, CA (US)

( * ) Notice: Subject to any disclaimer, the term of this patent is extended or adjusted under 35 U.S.C. 154(b) by 795 days.

(21) Appl. No.: 12/117,451

(22) Filed: May 8, 2008

Related U.S. Application Data

(62) Division of application No. 10/340,917, filed on Jan. 10, 2003, now Pat. No. 7,395,294.

(51) Int. Cl.
*G06F 7/38* (2006.01)

(52) U.S. Cl.
USPC .......................... 708/490; 708/230; 708/524

(58) Field of Classification Search
USPC ................. 708/230, 490, 524, 710
See application file for complete search history.

(56) References Cited

U.S. PATENT DOCUMENTS

| | | | |
|---|---|---|---|
| 4,623,981 A | 11/1986 | Wolrich et al. | |
| 4,760,544 A | 7/1988 | Lamb | |
| 4,872,131 A * | 10/1989 | Kubota et al. | 708/524 |
| 5,136,536 A | 8/1992 | Ng | |
| 5,260,897 A * | 11/1993 | Toriumi et al. | 708/524 |
| 5,560,039 A | 9/1996 | Dulong | |
| 5,948,050 A | 9/1999 | Diamondstein et al. | |
| 2002/0089348 A1 | 7/2002 | Langhammer | |
| 2003/0061253 A1* | 3/2003 | Evans | 708/700 |

\* cited by examiner

*Primary Examiner* — Chuong D Ngo
(74) *Attorney, Agent, or Firm* — Ropes & Gray LLP

(57) ABSTRACT

An arithmetic logic unit is provided. The arithmetic logic unit preferably includes a minimum of routing delays. An arithmetic logic unit according to the invention preferably receives a plurality of operands from a plurality of operand registers, performs an arithmetic operation on the operands, obtains a result of the arithmetic operation and that transmits the result to a result register. The arithmetic logic unit includes a signal propagation path that includes no greater than two routing paths that connect non-immediately adjacent logic elements.

20 Claims, 23 Drawing Sheets

= ic # ARITHMETIC LOGIC UNIT

CROSS REFERENCE TO RELATED APPLICATION

This is a division of, commonly-assigned U.S. patent application Ser. No. 10/340,917, filed Jan. 10, 2003, now U.S. Pat. No. 7,395,294.

BACKGROUND OF THE INVENTION

This invention relates to arithmetic logic unit ("ALU") circuitry.

ALU circuitry is used in microprocessors. Microprocessors process instructions in several stages. Typically microprocessors fetch—i.e., retrieve—an instruction, decode the instruction, read the operands upon which the instruction will be performed, execute an operation on the operands, and writeback the results of the operation to a suitable output such as a Random Access Memory via a Register Ram Write Port, a register bank or any other suitable location. The ALU circuitry typically forms a portion of, and is used in, the execute state of the microprocessor.

Generally, microprocessors are "pipelined." "Pipelining" refers to the fact that each of the processes of the microprocessor's stages may be occurring substantially simultaneously on different instructions. Thus, as the current instruction is being executed, a second instruction in the pipeline is being decoded and a third is being fetched from program memory.

Pipelined processors often have a delay between reading registers (in the Read stage) and writing registers (in the Writeback stage). This delay may be substantially overcome with respect to the processing steps of the microprocessor by "forwarding" the results of the execute stage for further use by the ALU before, or simultaneously to, the results are written to the Writeback registers. Forwarding ensures, that the result of the previous instruction can be used by the next instruction. In one type of microprocessor, forwarding multiplexors may be implemented to make the forwarded result available to the microprocessor if needed.

FIG. 1 shows a conventional ALU 100. ALU 100 typically includes registers 110 and 120 which typically provide operands A & B. ALU may perform any one, or more, suitable calculations on the operands. Operators that perform these operations are depicted as ALU sub-units 130. The results obtained from these ALU sub-units may be fed into multiplexor (MUX) 140. Thereafter, the selected result of MUX 140 may be registered as the result in register 150. This result may then be transmitted to the Register RAM Write Port and/or may forwarded to Fwd A MUX 160 and Fwd B MUX 170 for use by subsequent instructions or as subsequent instructions.

One drawback of the circuit in FIG. 1 is that ALU units are each formed as separate individual units and, therefore, require substantial die space additional routing resources—i.e., interconnect, wiring, etc.—and individualized logic. Furthermore, processing by the individual units and by MUX 140 may take a relatively long time to propagate and incur excess routing delays.

Routing delays provide significant sources of the signal propagation delays found in Programmable Logic Devices (PLD). Therefore, reducing routing delays would add great benefit to an ALU implemented in a PLD. Furthermore, it would also be beneficial with respect to PLDs that are formed primarily from four-input Look-Up-Tables (LUT) if the ALU could be implemented substantially using four-input LUTs.

Therefore, it would be desirable to provide ALU circuitry formed from a unified circuit that provides the functionality of multiple ALU units but minimizes the resources required by the ALU.

It would be further desirable to provide ALU circuitry that performs the various functions of ALU circuitry in a shorter time than conventional ALU circuitry.

It would also be desirable to provide ALU circuitry that is configured to provide substantial advantage when implemented in a four-input LUT-based PLD.

SUMMARY OF THE INVENTION

It is an object of this invention to provide ALU circuitry in the form of a unified circuit that provides the functionality of multiple ALU units but minimizes the resources required by the ALU.

It is a further object of the invention to provide ALU circuitry that performs the various functions of ALU circuitry in a shorter time than conventional ALU circuitry.

It is also an object of this invention to provide ALU circuitry that is configured to provide substantial advantage when implemented in a four-input LUT-based PLD.

An ALU according to the invention is provided. The ALU preferably receives a plurality of operands from a plurality of operand registers. The ALU then performs an arithmetic operation on the operands and obtains a result of the arithmetic operation. Finally, the ALU transmits the result to a result register.

The ALU includes a plurality of logic elements and a signal propagation path from the operand register, through the plurality of logic elements and into the result register. The signal propagation path preferably includes no greater than two routing paths that connect non-immediately adjacent logic elements

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
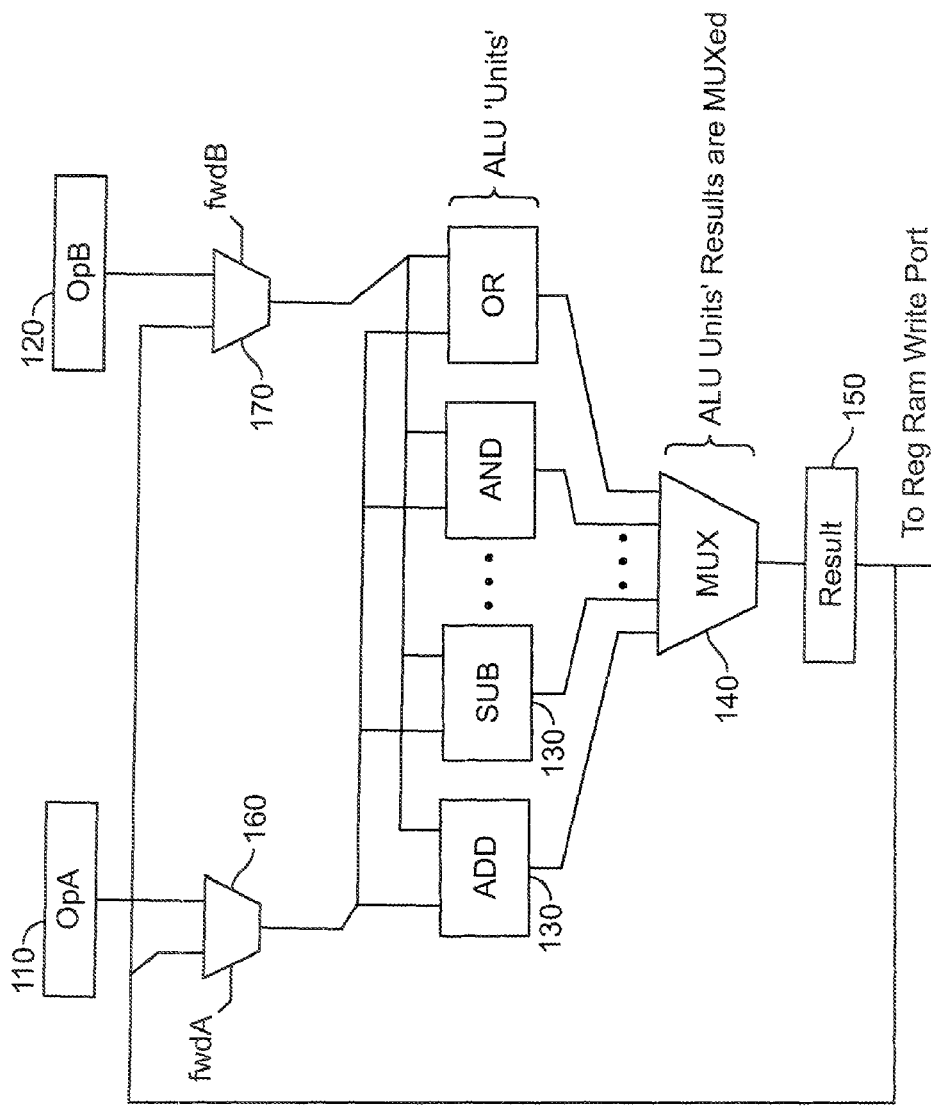
FIG. 1 is a schematic diagram of a conventional ALU.

ALU circuitry according to the invention is provided. The ALU circuitry according to the invention preferably includes fewer logic gates and logic modules than are required by the conventional ALU circuitry. Furthermore, ALU circuitry according to the invention, may include only a single MUX (which may be implemented in a four-input LUT and which is typically propagated to and from using interconnect that is not non-nearest neighbor interconnect (see definition below)) between the register that provides the operand to the ALU and the result register at the output of the ALU. This configuration obtains a substantial reduction in routing delays than is available in the prior art. Because routing delays are significant sources of delay in ALUs in particular and in all devices which utilize ALUs generally, such as PLDs, an ALU according to the invention is significantly faster than a conventional ALU.

It should be noted that there are generally two types of routing delays in a PLD. First, there is a "nearest neighbor" routing delay. This refers to a routing delay that exists between signals propagated from one logic element of the PLD to the immediately adjacent logic element of the PLD. The "nearest neighbor" routing delays are generally minimal because limited "choice" exists for the PLD to route the outputs in one direction or another and therefore the signals are routed over nearest neighbor interconnect that does not include extensive switching or other time-consuming routing resources.

"Non-nearest neighbor" delays, on the other hand are generally greater than "nearest neighbor" delays. Non-nearest neighbor delays typically require routing over the local interconnect or even global interconnect in order to provide options of directing the output to available resources. The terms local interconnect and global interconnect are described in more detail below with reference to FIG. 2A. These routing delays are generally more substantial than nearest neighbor delays.

ALU circuitry according to the invention preferably reduces routing delays, especially non-nearest neighbor routing delays as described above, as follows. A typical ALU requires (or is associated with) a register to receive and store each operand for use by the ALU. Thereafter, the ALU can use the stored (or, alternatively, latched) operand. The typical ALU also requires (or is associated with) a register on the output to latch the result of the ALU. In between the two registers, the ALU is formed from multiple ALU sub-units, each of which is configured to provide some arithmetic functionality. Typical ALUs also include a MUX to receive and select from the various ALU sub-units and to provide the selected output of one of the units to be latched in the result register. Thus, a typical ALU requires at least three substantial routing delays—i.e., 1) from the input or operand register to the MUX used to select between the new operand and the forwarded operand 2) from the MUX to the MUX used for selecting the output of the desired ALU unit 3) from the MUX used for selecting the output to the result register (or, alternatively, the output register). It should be noted that any delays associated with propagating to and from either MUX are typically non-nearest neighbor type routing delays.

ALU circuitry according to the invention, however, may substantially eliminate the routing delay associated with the selecting MUX. This may be accomplished by taking advantage of the intrinsic MUX functionality in the result register. The result register typically includes sufficient functionality to provide both MUX functionality and register functionality without requiring the selecting MUX and its associated routing.

In one embodiment of the invention, an XOR gate may also be used to combine the results of the arithmetic and logical units associated with the ALU instead of the usual MUX. This obtains several benefits: some operations can exploit the XOR functionality without increasing the size of the logical or arithmetic units. Furthermore, the absence of a mux-select line enables a more significant size reduction as the XOR gate can be combined with forwarding muxes without exceeding four-input LUT size.

In another aspect of the invention, complementation may be built into one of the forwarding muxes. This is done without increasing the number of LUTs, and allows extra functionality—e.g., enabling the adder to perform subtraction.

The following FIGURES, and the corresponding written description, show this principle of the invention, and the advantages obtained therefrom, in more detail.

Figure 2:
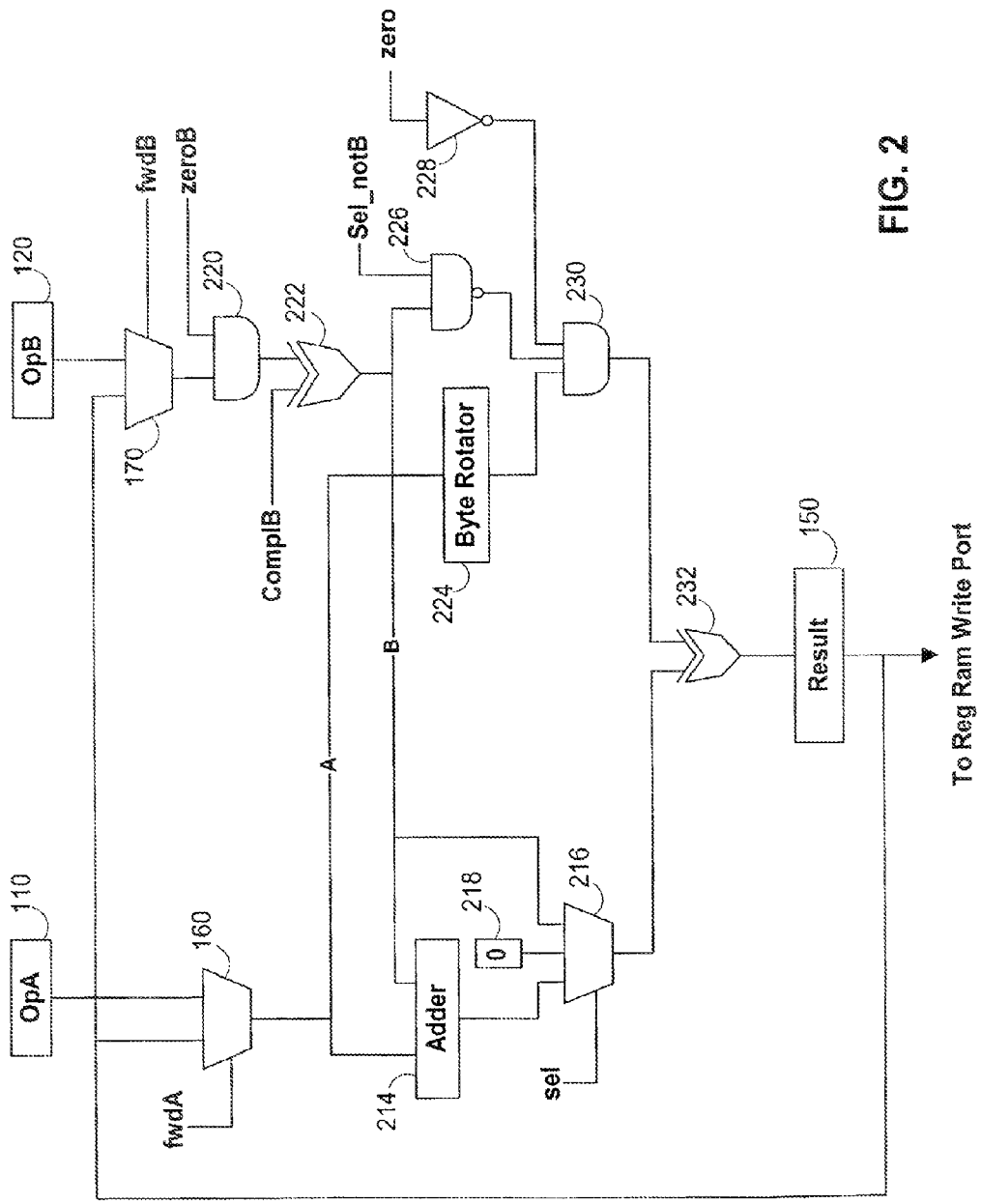
FIG. 2 is a schematic diagram of an ALU according to the invention.

FIG. 2 is a schematic diagram of ALU circuitry 200 according to the invention. ALU circuitry preferably includes Fwd MUX A 160, Fwd MUX B 170, Adder 214, MUX 216 (the functionality of which will be incorporated into a result register, as explained below, thereby obviating the need for the MUX structure, and the associated routing delays), zero block 218, AND gate 220, XOR gate 222, byte rotator 224, NAND gate 226, inverter 228, AND gate 230, and XOR gate 232. It should be noted that the actual structures shown may be implemented in four-input LUTs or in any other suitable logic arrangement as is known to one skilled in the art. ALU circuitry is also associated with the registers for Operand A and Operand B 210 and 220 as well as result register 150.

Figure 2A:
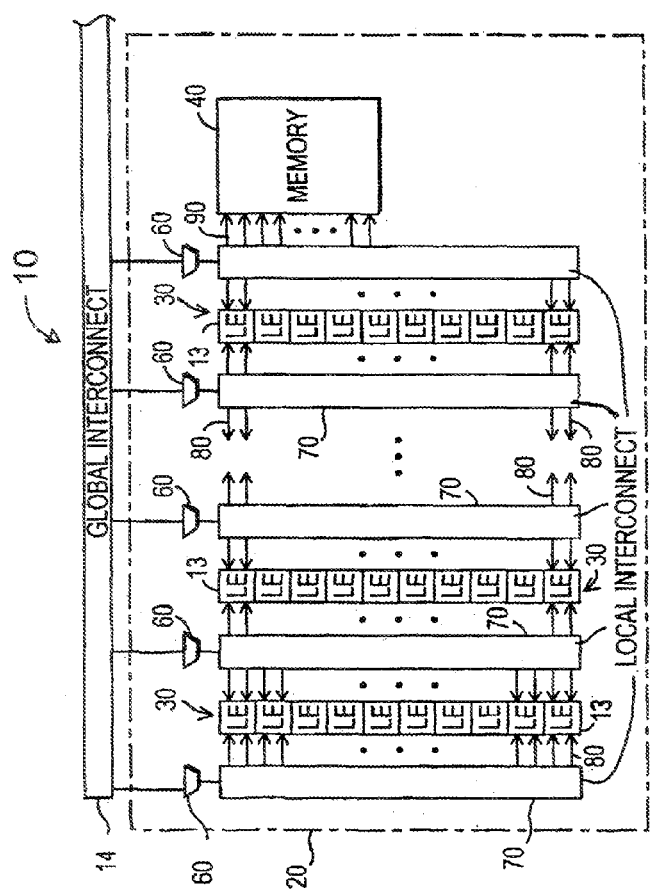
FIG. 2A is a schematic diagram of a PLD that may be used to implement an ALU according to the invention.

FIG. 2A shows a schematic diagram of a PLD in which an ALU according to the invention may be implemented. The illustrative PLD 10 shown in FIG. 2A includes a two-dimensional array of intersecting rows and columns of "super-regions" 20 of programmable logic and other resources. Each super-region 20 includes a plurality of "regions" 30 of programmable logic, and a region 40 of memory. Each super-region 20 also includes some relatively local interconnection resources such as programmable logic connectors ("PLCs") 60, the regions of interconnection conductors and PLCs labeled 70, logic-element-feeding conductors 80, and memory-region-feeding conductors 90. (Throughout the accompanying drawings many elements that are actually provided in multiple instances are represented by just single lines or other single schematic symbols. Thus, for example, each PLC 60 in FIG. 2A is actually representative of many instances of such PLC circuitry.)

Each region 30 includes a plurality of "logic elements" 13. Each logic element (or "logic module" or "subregion") 13 is an area of programmable logic that is programmable to perform any of several logic tasks on signals applied to the logic element to produce one or more logic element output signals. For example, each logic element 13 may be programmable to perform one place of binary addition on two input bits and a carry-in bit to produce a sum-out bit and a carry-out bit. Each logic element 13 also preferably includes register (flip-flop) circuitry for selectively registering a logic signal within the logic element. Each of elements 13 may be formed from a four-input LUT. Furthermore, elements 13 may form carry chains and cascade chains (not shown here) which will be described in more detail below.

Conductors 80 apply what may be thought of as the primary main inputs to each logic element 13 (although logic elements may also have other inputs). The outputs of logic elements 13 are not shown in FIG. 2A to avoid over-crowding the drawing. However, those outputs typically go to local interconnect resources 70 and other more general-purpose interconnection resources such as the global interconnect 14 associated with the row of super-regions 20 from which that logic element output came. There may also be another level of horizontal, general-purpose interconnect associated with each super-region 20 that is not shown in FIG. 2A (again to avoid over-crowding the drawing). This would include conductors that extend across the super-region and that are usable for conveying signals between the regions 30 and 40 in that super-region. The output signals of the logic elements 13 in each super-region 20 are also typically applied to that level of interconnect, and that level of interconnect also typically provides additional inputs to PLCs 60.

PLCs 60 (of which there are many for each local interconnect region 70) are programmable (e.g., by associated function control elements ("FCEs")) to select any of their inputs for output to the associated local interconnect 70. Each local interconnect 70 is programmable (again by FCEs) to route the signals it receives to the adjacent logic elements 13 or memory region 40.

Vertical global interconnection resources (not shown) may also be provided for making general purpose interconnections between the rows of super-regions 20.

Terms like "super-region", "region", and "logic element" or the like are used herein only as relative terms to indicate that relatively small elements may be grouped together in larger elements or units. These terms are not intended to always refer to circuitry of any absolute or fixed size or capacity. And indeed, if a hierarchy of relative sizes is not relevant in a particular context, these various terms may be used interchangeably or as essentially generic to one another.

ALU circuitry 200 preferably may be used to implement substantially all the functionality of a conventional ALU. Many examples of the functions of ALU 200 are described below in the text associated with FIGS. 2-9. These examples are provided to show that ALU 200 includes the functionality of a typical ALU, but should not be understood to limit the functionality of an ALU according to the invention to these particular functions.

ALU circuitry 200 preferably includes less routing depth than a conventional ALU. Following the written description of the functionality of the ALU associated with FIGS. 2-9, one precise implementation of the reduction of the routing delays will be explained in the written description corresponding to FIGS. 10-18.

Figure 3:
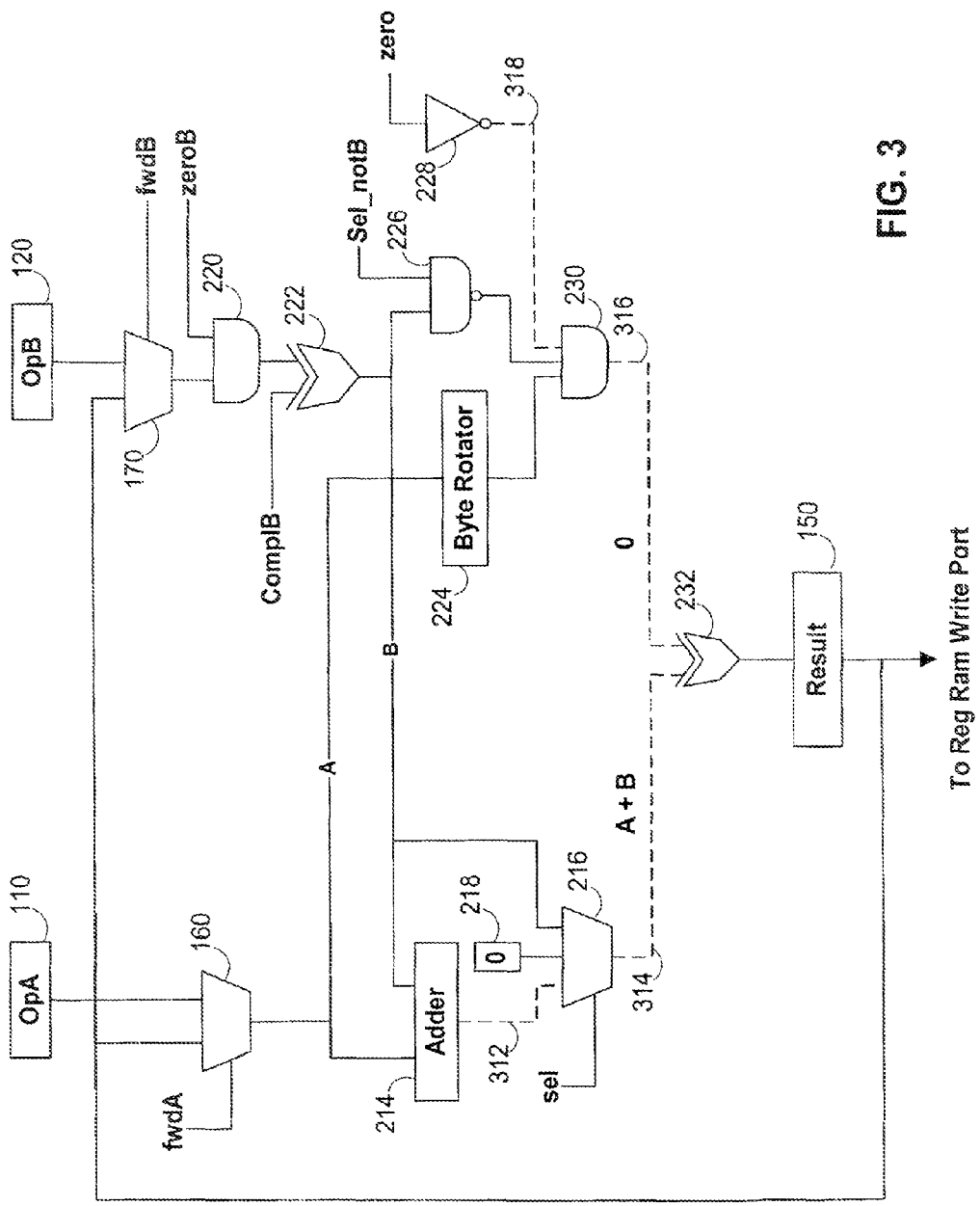
FIG. 3 is a schematic diagram of an ALU according to the invention implementing addition functionality.

FIG. 3 shows implementation of an addition functionality. The hatching of lines 312, 314, 316, and 318 indicates that the functionality associated with these lines is central to the configuration being implemented. Other lines may also be activated, such as the lines associated with operands A and B. Nevertheless, the other lines have not been hatched in order to more clearly and concisely show and describe the operation of the invention.

In the addition implementation, the values from A will be added to B, each of which may be understood to represent any suitable size busses such as an sixteen-bit bus or a thirty two-bit bus, as follows. Adder 214 preferably receives the values from A and B and performs addition on the values. The result from Adder 214 is then selected in MUX 216 for transmission to XOR gate 232. This result is then transmitted into the XOR. The other input into the XOR is generated by inverter 228. The output of inverter 228 may preferably be a word of the same bit length as A or B. The output of inverter 228 may also preferably be all zeroes. Thus the output of AND gate 230 will also be all zeroes. Therefore, the only ONES that are output from XOR gate 232 will be generated by ONES output in the result of adder 214.

Figure 4:
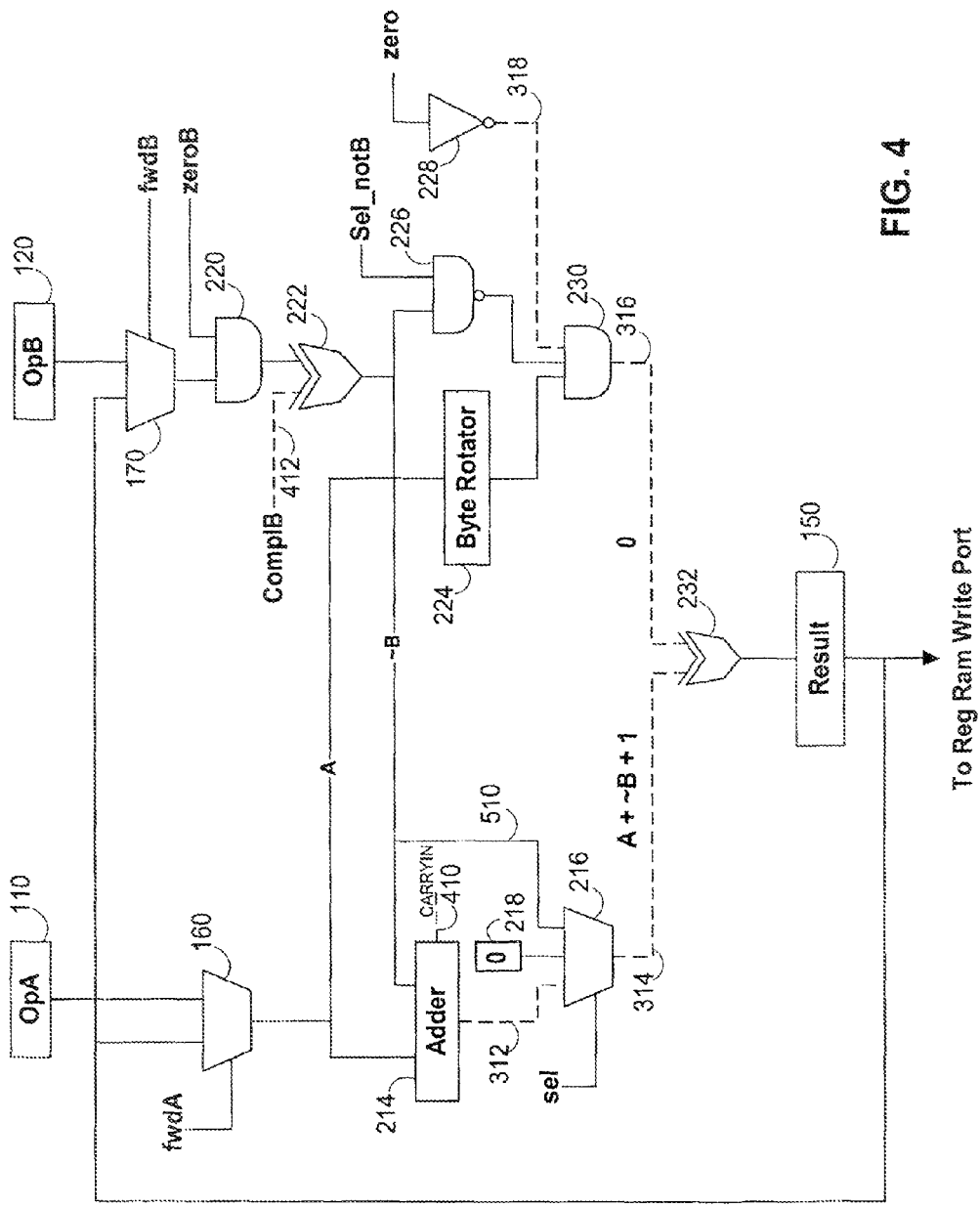
FIG. 4 is a schematic diagram of an ALU according to the invention implementing subtraction functionality.

FIG. 4 shows implementation of a subtraction functionality. Lines 312, 314, 316, and 318 are all activated. Furthermore, a carryin 410 has been introduced to adder 214. Also, the complement values for B are used as provided by hatched line 412. In this particular embodiment, the subtraction functionality is implemented adding A and the complement of B and adding 1 (derived from the carryin bit) as is well known in the art when using twos complement logic. The addition of A+B+1 becomes the selected result from MUX 216.

The selected result from MUX 216 is then transmitted as one of the inputs to XOR gate 232. The other input is a zero. This provides an output from XOR gate 232 that corresponds to the result of A-B.

Figure 5:
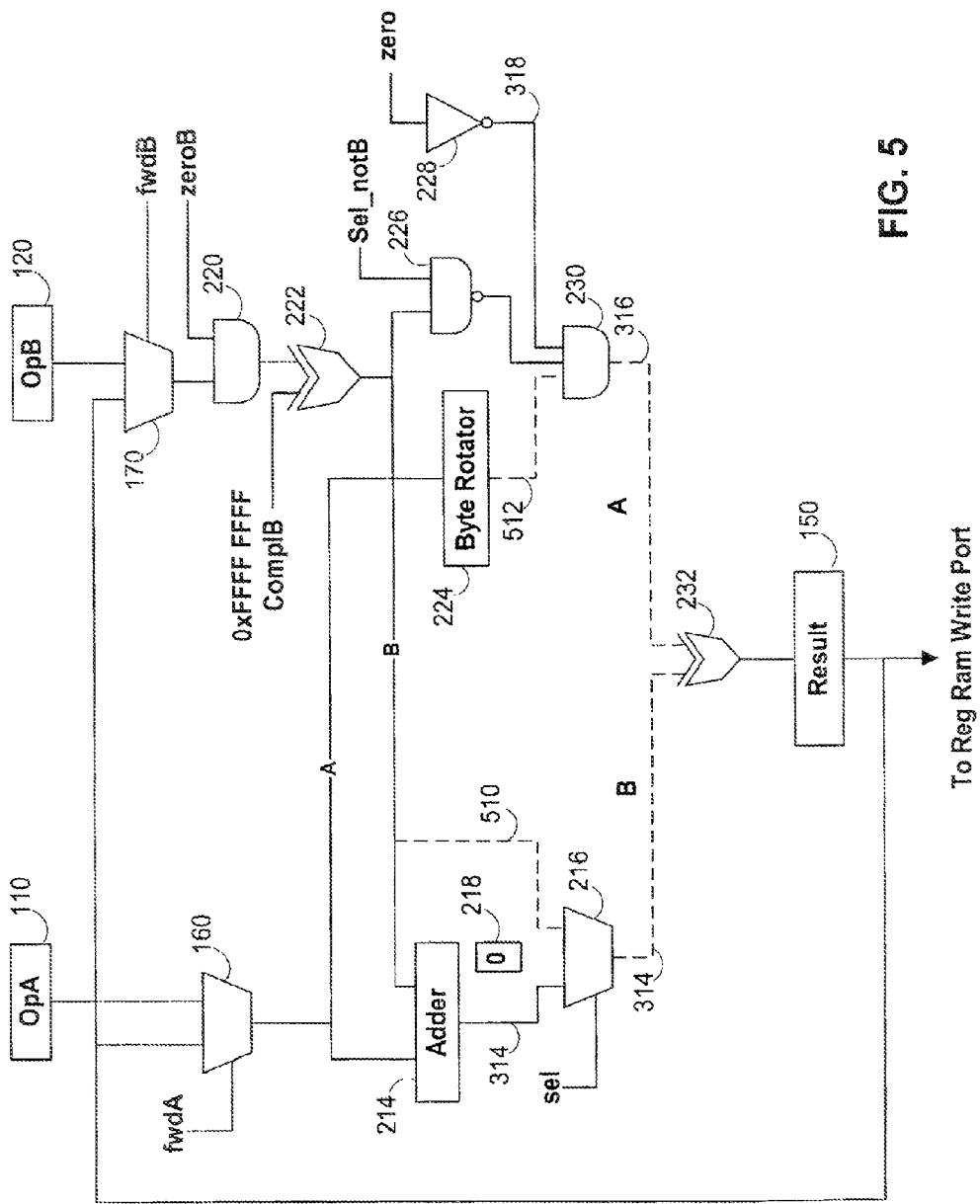
FIG. 5 is a schematic diagram of an ALU according to the invention implementing exclusive XOR functionality.

FIG. 5 shows ALU 200 when it is implementing XOR functionality. In this particular implementation, hatched lines 314, 316, 510 and 512 are activated. The implementation of ALU 200 as an XOR gate simple provides each of operands A and B to the two inputs of XOR gate 232, respectively. Hatched line 510 provides B to MUX 216, which is then selected to be transmitted to XOR gate 232. Hatched line 512 transmits the A operand after is it passed unchanged through byte rotator 224.

Figure 6:
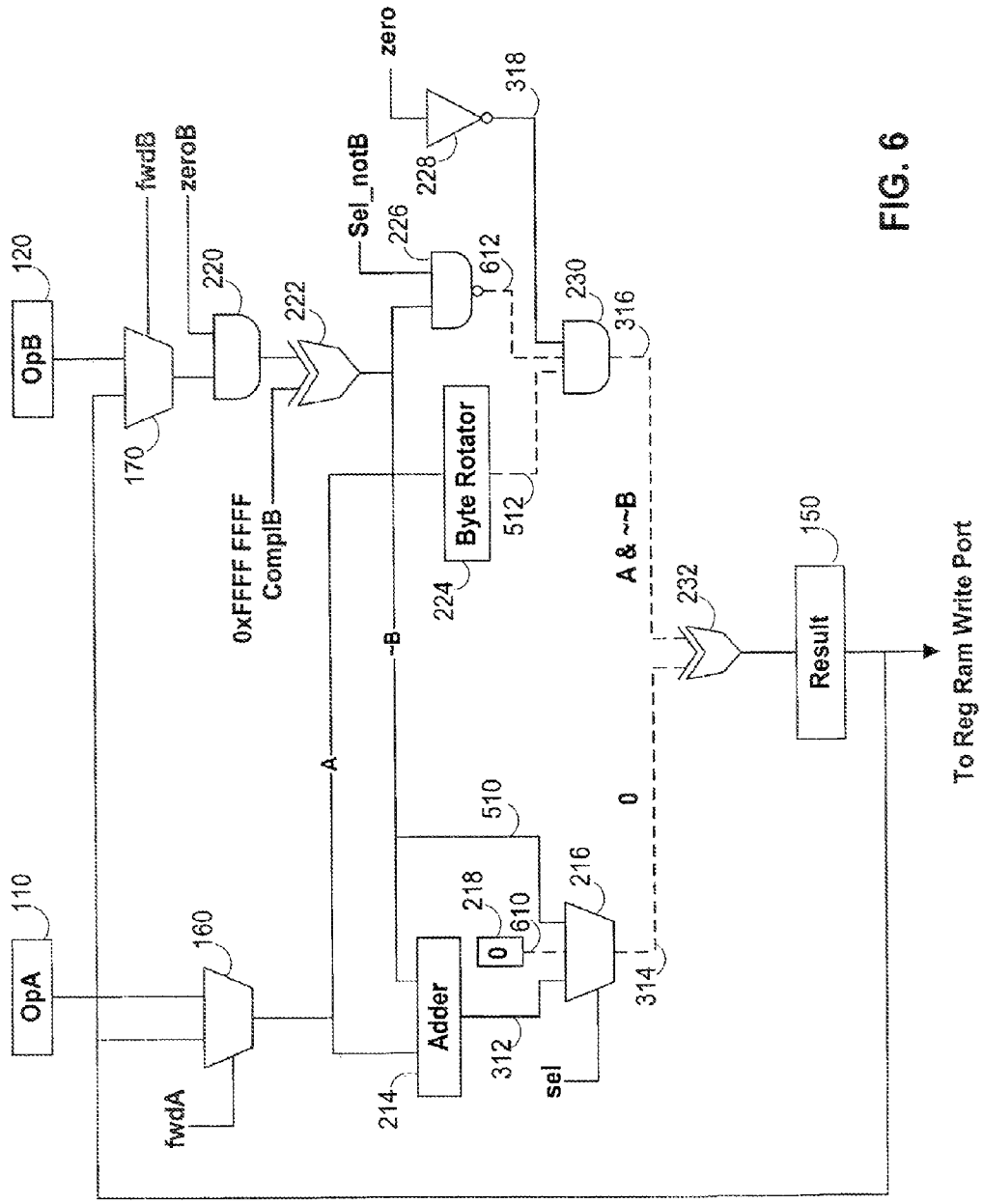
FIG. 6 is a schematic diagram of an ALU according to the invention implementing AND functionality.

FIG. 6 shows ALU 200 when it is being used for AND functionality. In this particular embodiment, the complement of the complement of B is derived from using XOR gate 222 to provide a first complement of B by inputting B and all ONES (indicated by the hexadecimal term 0xFFFF FFFF (which indicates 32 bits of all ONES) as shown in FIG. 6) into XOR gate 222, respectively. Then the complement of B is again complemented by using NAND gate 226 with inputs complement B and Sel_notB (which, when input all ONES into Sel_notB, will obtain the complement of the complement of B).

A is passed through AND gate 230 together with the complement of the complement of B and a high signal. This combination produces the result of A AND B. This result is then passed through XOR gate 232 with a zero signal which was generated along line 612. The result from XOR gate will also be A AND B.

Figure 7:
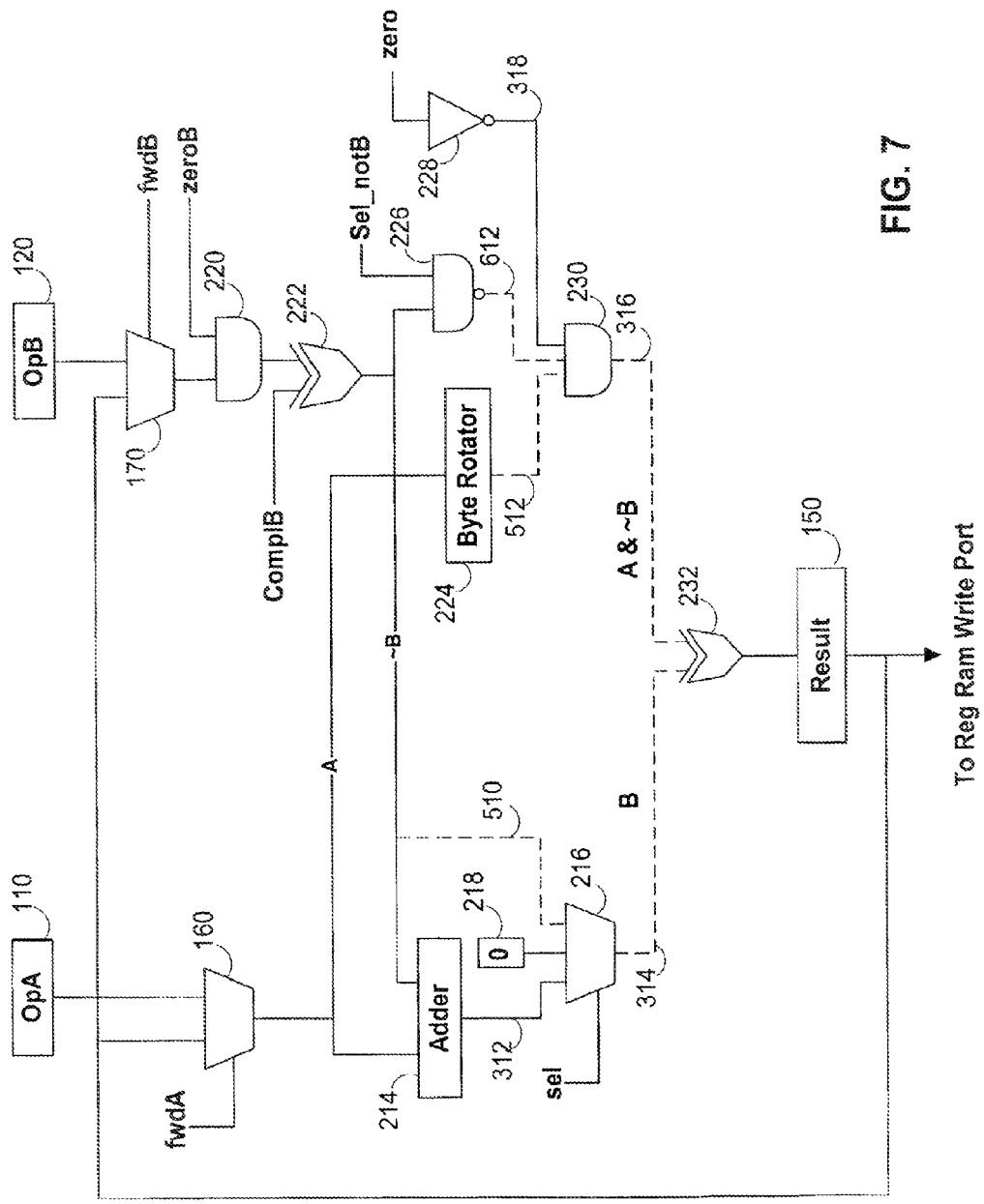
FIG. 7 is a schematic diagram of an ALU according to the invention implementing OR functionality.

FIG. 7 shows the implementation of OR functionality in ALU 200. In this particular implementation, hatched lines 314, 416, 510, 512, and 612 are preferably activated. Thus, as indicated in FIG. 7, A is passed through AND gate 230 to obtain the result A AND the complement of B. Then, this result is transmitted to XOR gate 232 where it is one input and B is the other input. This preferably provides the result A OR B.

Figure 8:
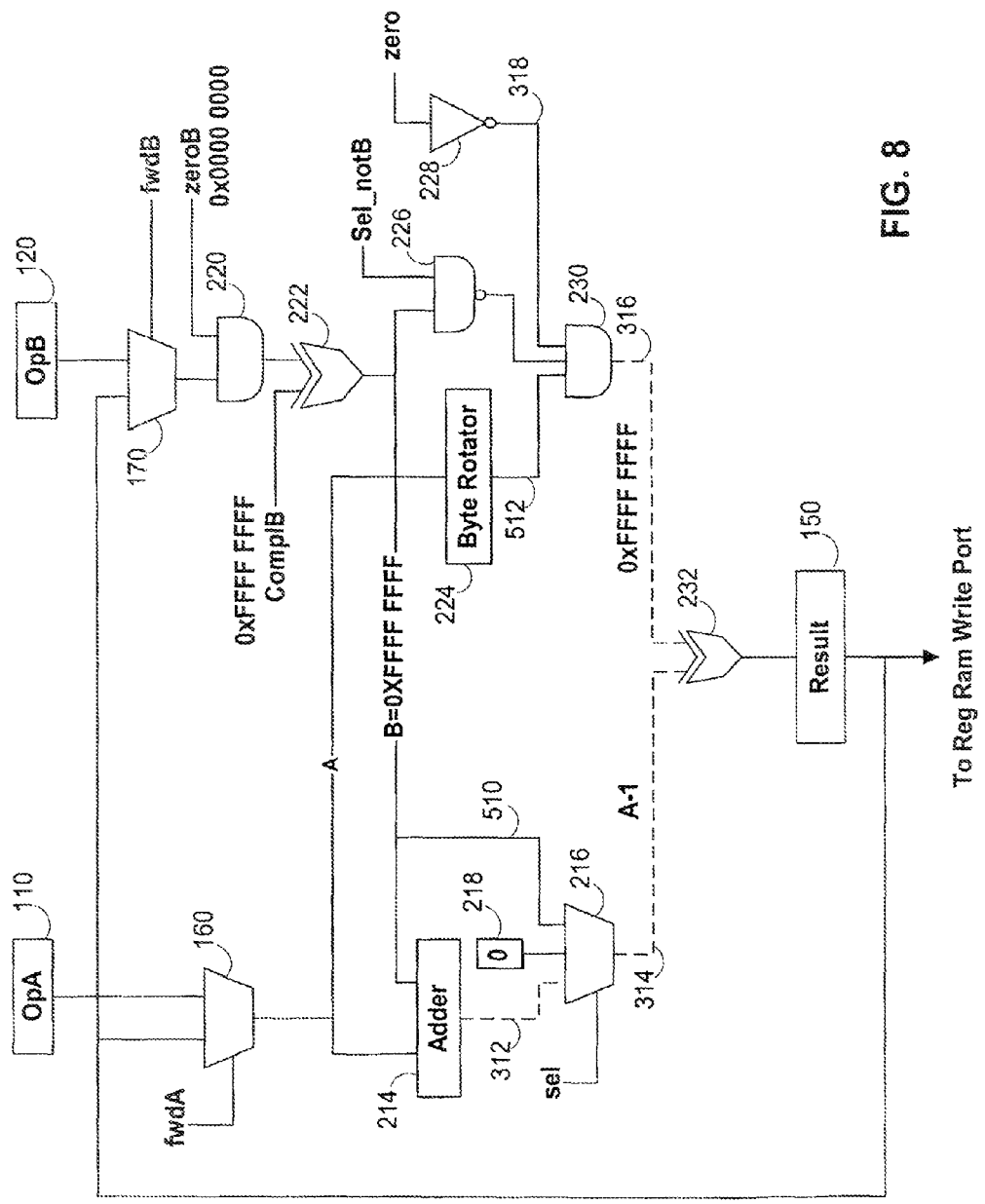
FIG. 8 is a schematic diagram according to the invention that provides the negation of operand A.

FIG. 8 shows the implementation of how the negation of A is derived. In this implementation, B is input together with a full word of ZEROES in AND gate 220. Then, the output of AND gate 220 is input into XOR gate 222 with a full word of ONES. The result is that B will take on the characteristics of B=0xFFFF FFFF. In twos complement A+0xFFFF FFFF=A+(−1)=A−1 which is then obtained from Adder 214 and then is transmitted to XOR gate 232 together with a full 32 bits of ONES. The result obtained is the negation of A.

Figure 9:
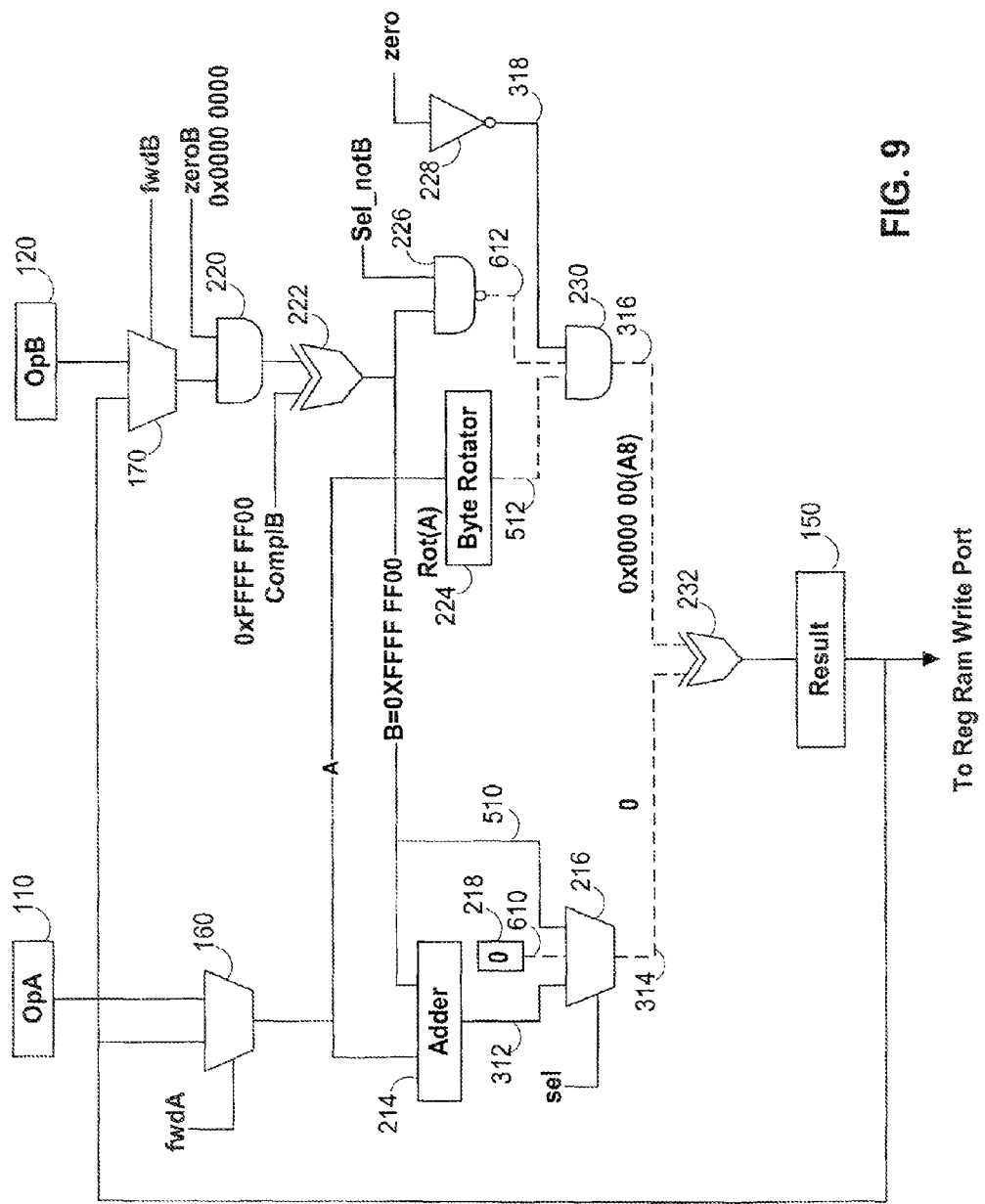
FIG. 9 is a schematic diagram according to the invention implementing byte-from-word extraction functionality.

FIG. 9 shows the implementation of functionality associated with extracting a byte from a word. In this FIGURE, lines 314, 316, 512, 610, and 612 are hatched to indicate the functioning of the invention. In this implementation, B is input into AND gate 220 together with a full set of ZEROES. Then, using a 0xFFFF FF00 input into XOR gate 222, an output of 0xFFFF FF00 is obtained. This output is then input into NAND gate 226 which, when input together with a full set of ONES, obtains an output of 0x0000 00FF. When input into AND gate 230, 0x0000 00FF essentially masks whatever three bytes have been rotated into the left-most three byte positions of A to provide a result that includes the selected byte from A in the right-most position.

Figure 10:
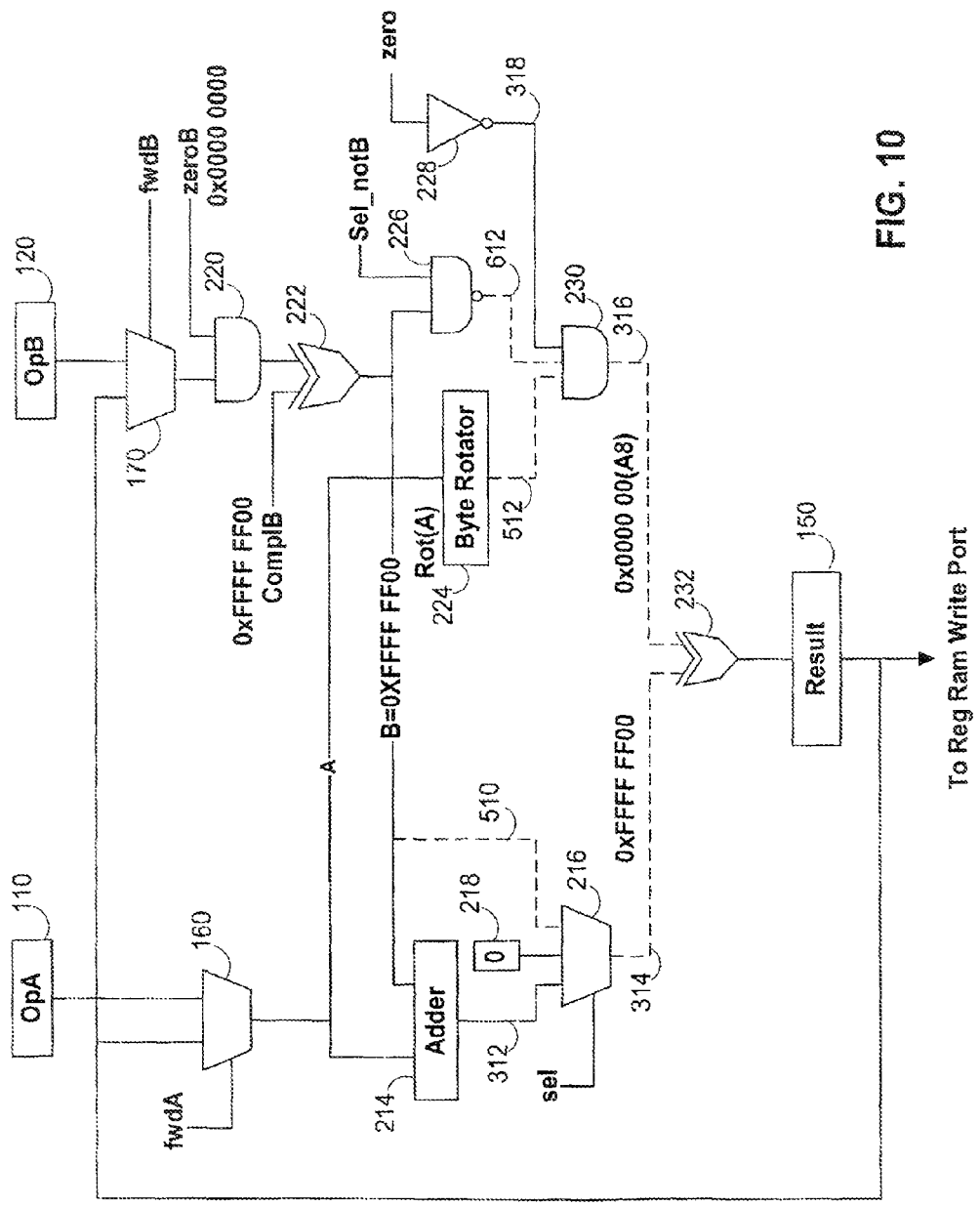
FIG. 10 is a schematic diagram according to the invention implementing Sign Extension functionality.

FIG. 10 adds a sign extension functionality to the configuration shown in FIG. 9. The sign extension is implemented by selecting the B input in MUX 216 and allowing B to provide ONES to the all the non-extracted bytes in A. This is a process known as sign extraction.

Figure 11:
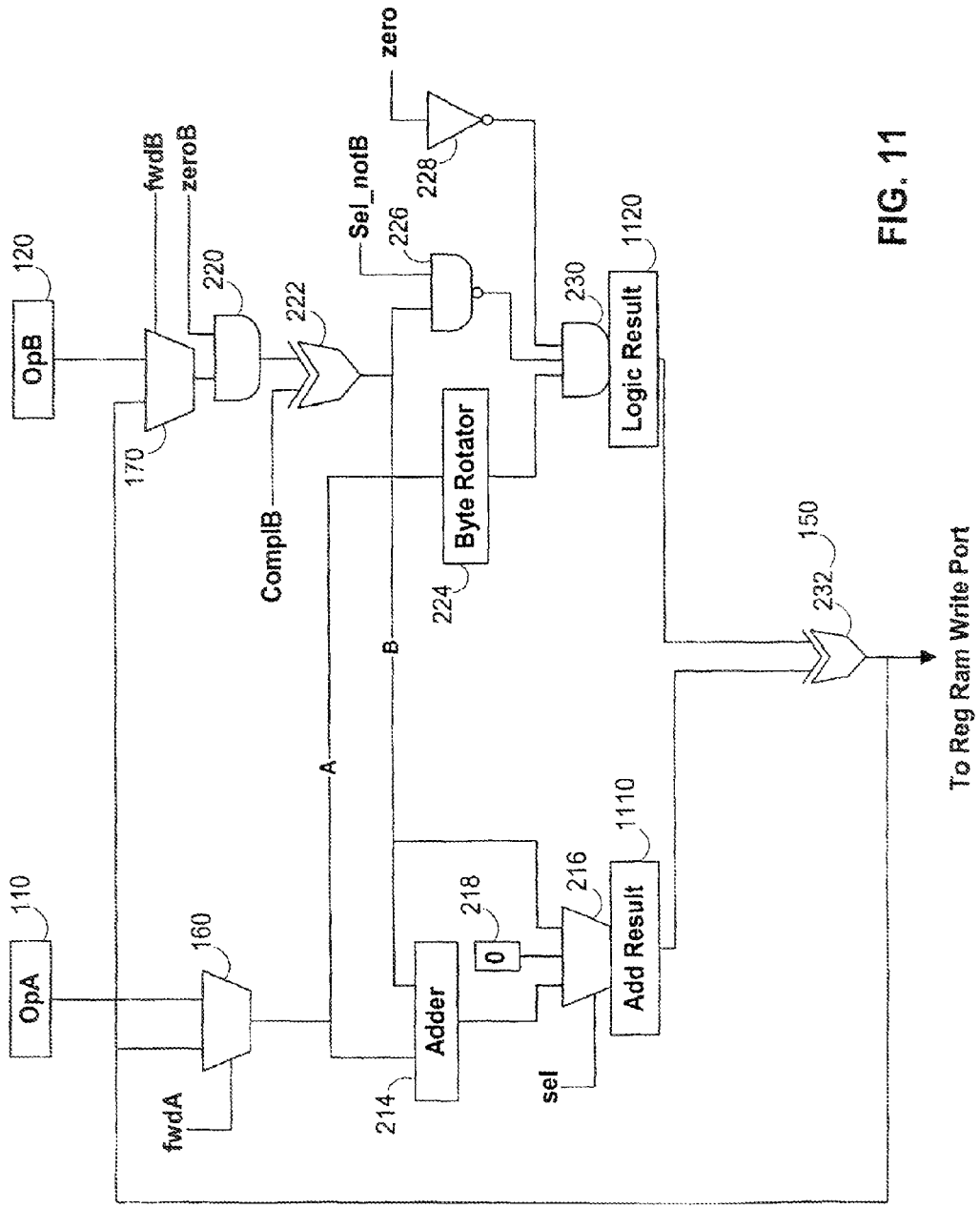
FIG. 11 is a schematic diagram according to the invention showing an alternative configuration of the result register.

FIG. 11 shows the first step of optimization and elimination of routing delays in an ALU according to the invention. First, in order to implement the ALU according to the invention, the register 150 is formed from two parallel registers 1110 and 1120. For reasons to be detailed below, each of the registers 1110 and 1020 are then placed adjacent MUX 216 and AND gate 230.

Figure 12:
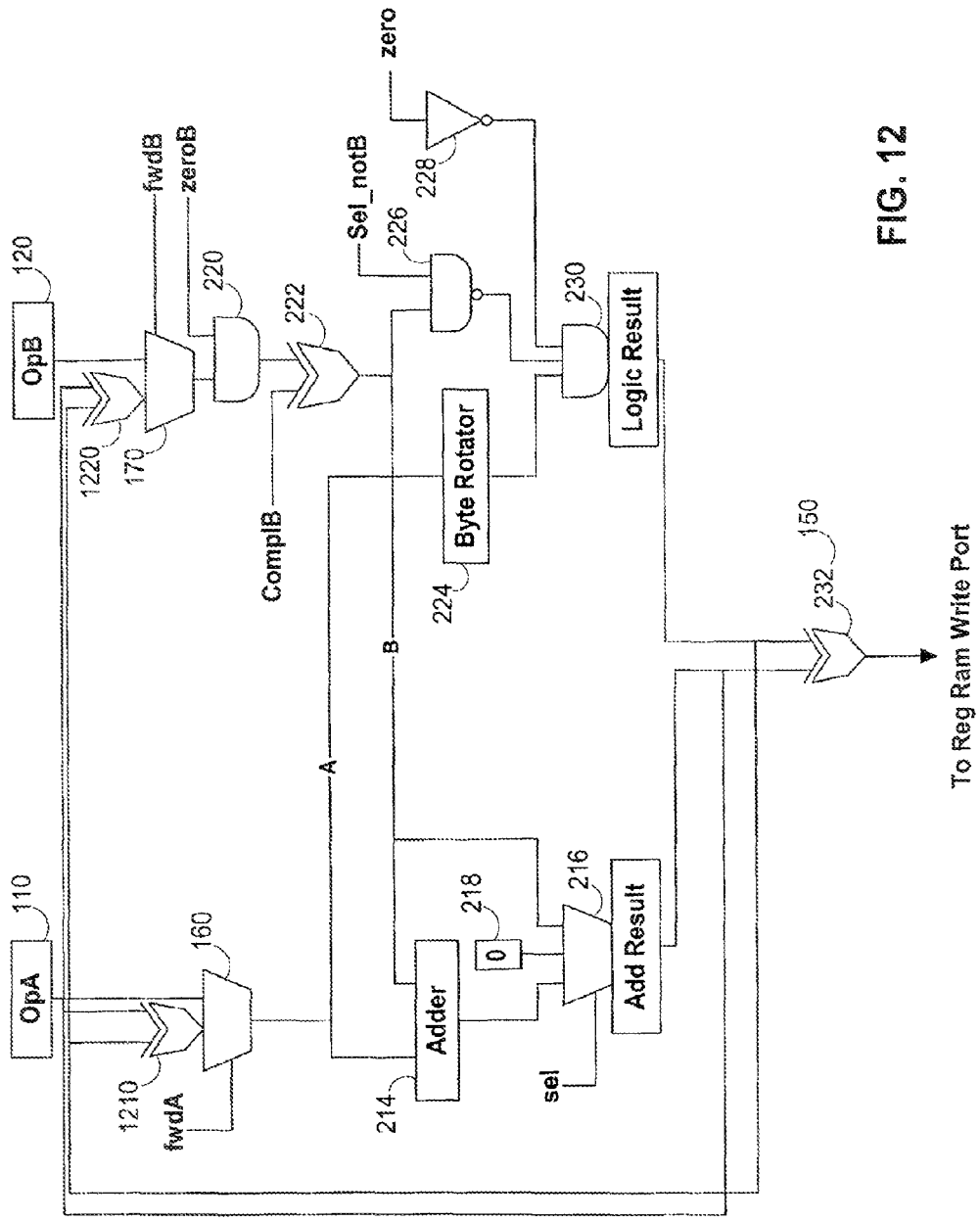
FIG. 12 is a schematic diagram according to the invention showing logic duplication.

Then, FIG. 12 shows that XOR gate is duplicated at one of the two inputs to Fwd MUX A 160 and Fwd MUX B 170. The juxtaposition of XOR gate 1210 and 1220 to Fwd MUX A 160 and Fwd MUX B 170, respectively, provides for a logic combination that may be implemented as follows.

Figure 13:
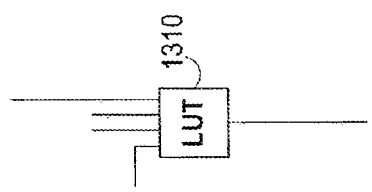
FIG. 13 is an equivalent schematic circuit for the duplicated logic and a forwarding Multiplexor according to the invention.
Figure 13:
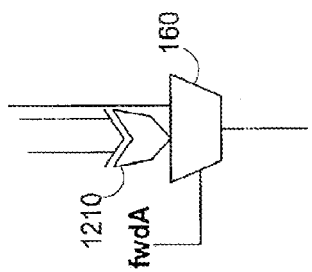

FIG. 13 indicates the logic combination of the XOR gate and the MUX may be implemented in a single, four-input LUT 1310.

Figure 14:
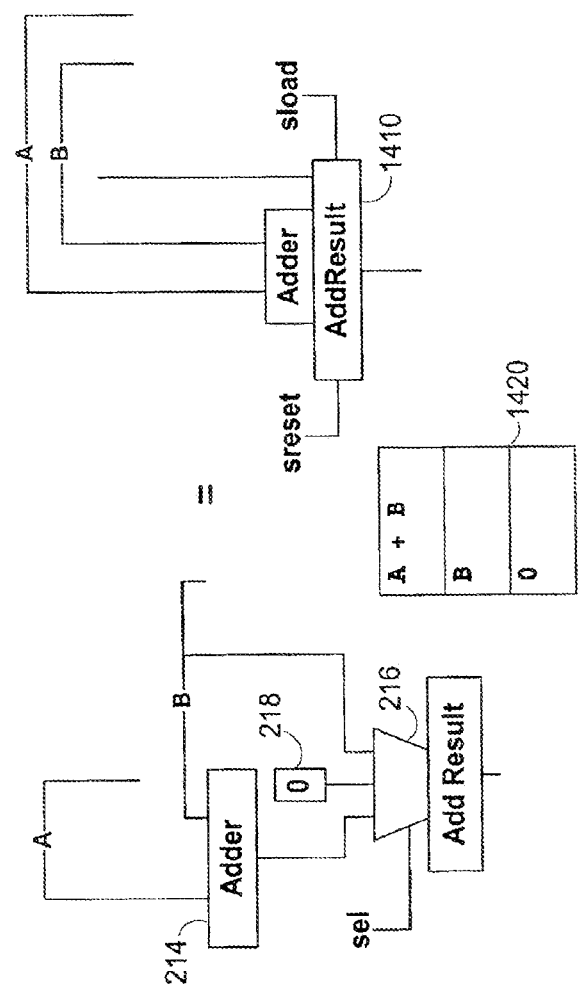
FIG. 14 is an equivalent schematic circuit for a portion of the ALU according to the invention.

FIG. 14 shows the implementation of another combination of a portion of elements of ALU 200. Adder 214, MUX 216, zero block 218, and register 1110 may all be combined in adder/register 1410. It should be noted that, by using the capabilities of the register 1110 together with the additions of an sreset (synchronous reset) line and an sload (synchronous load) line, MUX 216 is no longer needed and the routing delays associated therewith have been eliminated. A table 1420 is shown in FIG. 14 which indicates that the selectable inputs to adder/register 1410 may be A+B, B, or ZERO.

Figure 15:
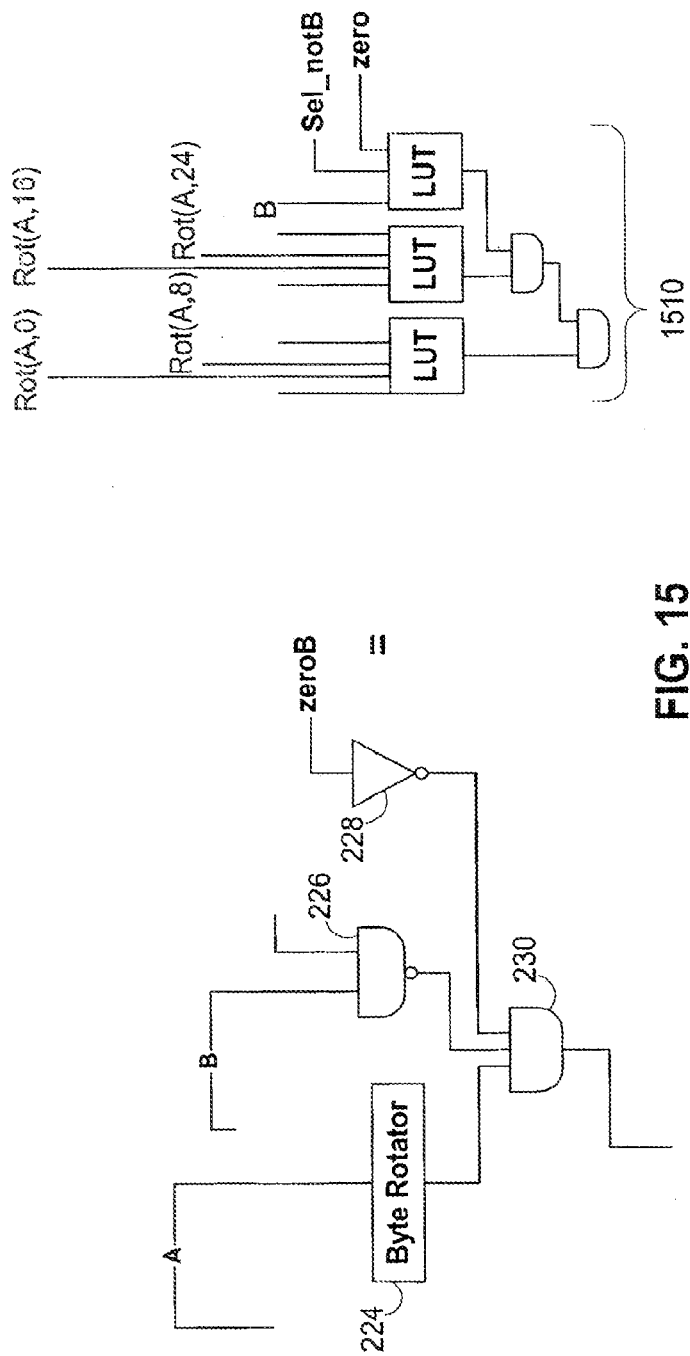
FIG. 15 is an equivalent schematic circuit for another portion of the ALU according to the invention.

FIG. 15 shows the implementation of still another combination of a portion of elements of ALU 200. FIG. 15 shows that byte rotator 224, NAND gate 226, inverter 228, and AND gate 230, can be implemented as three LUTs in a cascade AND chain 1510. A cascade AND chain is a special purpose device that may be found in particular programmable logic devices. The purpose of cascade AND chains is to implement a wide AND function, using non-nearest neighbor numerous LUTs cascaded through AND gates, at a speed that is faster than the speed obtained when performing the same mathematical functions using multiple four-input LUTs. In the particular configuration shown in FIG. 15, the capabilities of cascade AND chain 1510 are able to produce all the required logic for this portion, which includes the byte rotator capable of rotating the A operand by one byte at a time, of ALU 200. The control signals necessary to implement a byte rotator are known to one skilled in the art. This implementation may substantially increase the speed of this portion of ALU 200 because the delays between components of the cascade AND chain are typically nearest neighbor delays, as defined above, which are less substantial than non-nearest neighbor delays associated with most four-input LUTs found in PLDs.

Figure 16:
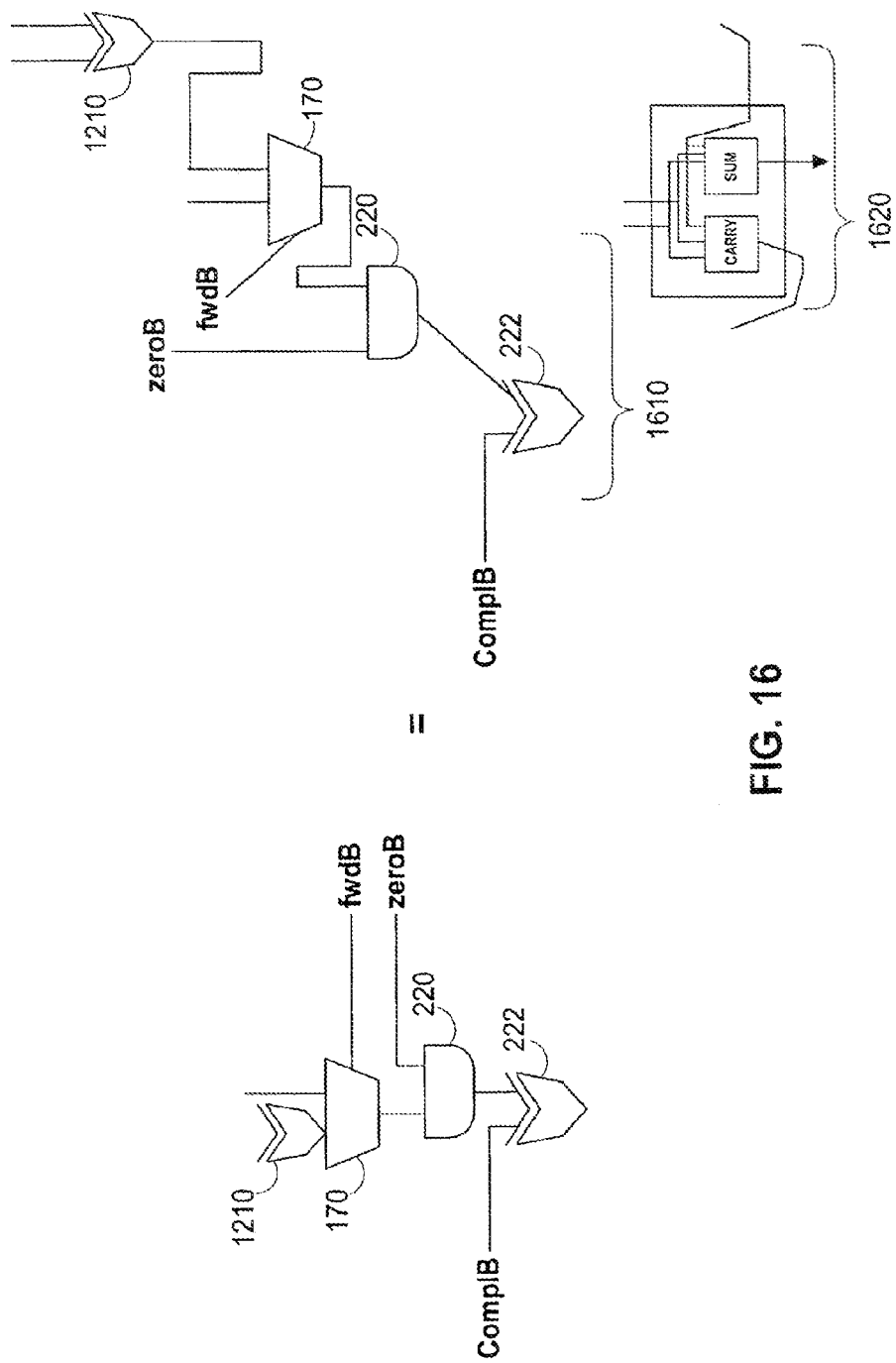
FIG. 16 is an equivalent schematic diagram for yet another portion of the ALU according to the invention.

FIG. 16 shows an implementation of another portion of the elements in ALU 200. FIG. 16 shows that AND gate 220, XOR gate 222, XOR gate 1220, and MUX 170 can be implemented in a carry chain 1610. A carry chain, as shown more particularly in 1620, is a special purpose device, using numerous three-input LUTs that have a carry signal from one LUT to the next, that may be found in particular programmable logic devices. The purpose of carry chains is to implement certain mathematical functions at a speed that is faster than the speed obtained when performing the same mathematical functions using multiple four-input LUTs. In the particular configuration shown in FIG. 16, the capabilities of carry chain 1610 are able to produce all the required logic for this portion of ALU 200. This implementation substantially increases the speed of this portion of ALU 200 by utilizing a carry chain which typically implements nearest neighbor delays, as defined above.

Figure 17:
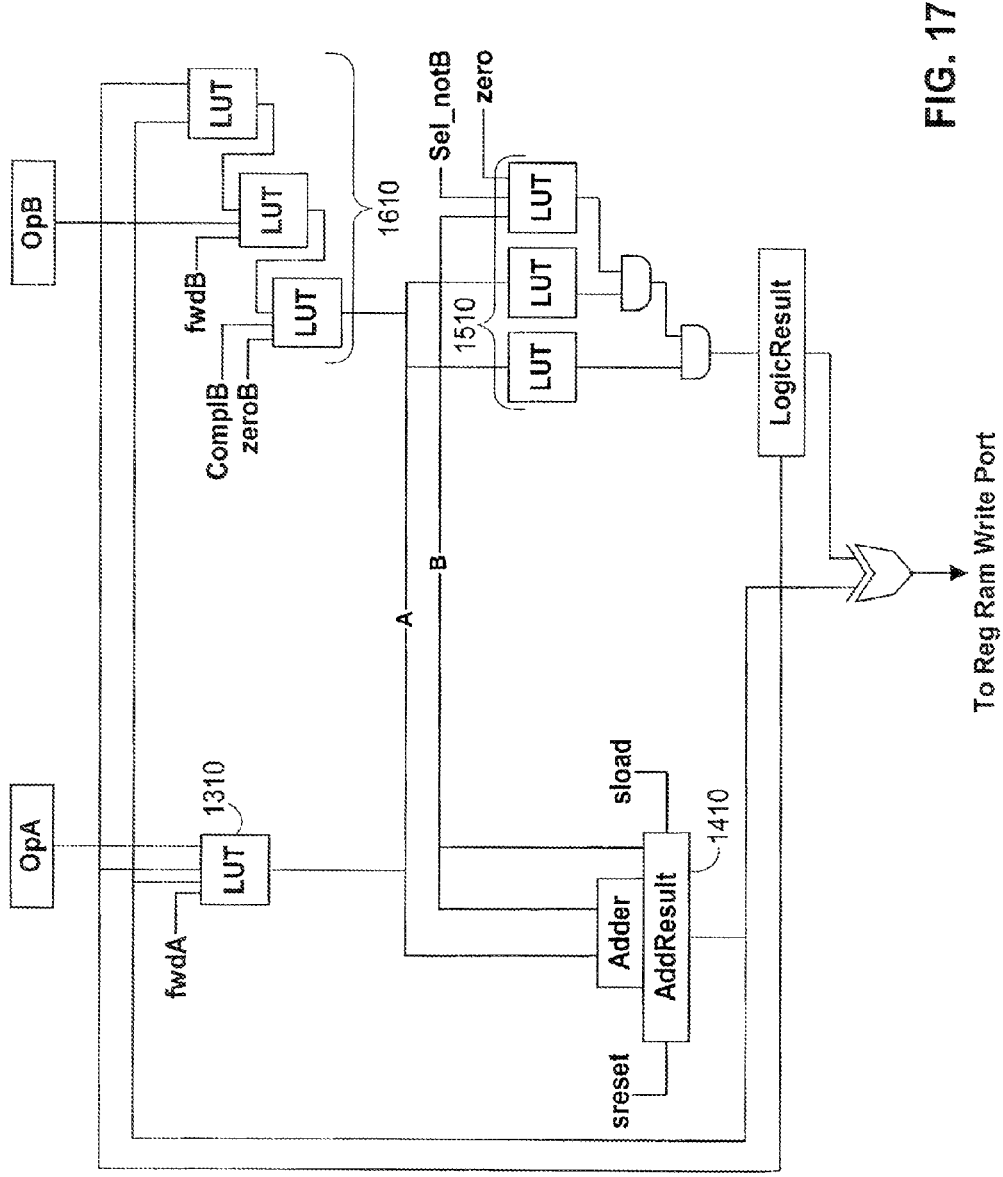
FIG. 17 is an ALU according to the invention which implements the alternative circuitry shown in FIGS. 11-16.

FIG. 17 shows ALU 200 according to the invention with each of the various implementations of logic. These implementations include LUT 1310, adder/register 1410, cascade AND 1510, and carry chain 1610. Thus the invention implements ALU 200 with only two non-nearest neighbor routing delays between registers. Non-nearest neighbor routing delays are significant in programmable logic devices and, therefore, ALU 200 processes signals significantly faster than conventional ALUs. To reduce the non-nearest neighbor routing delays, ALU 200 takes advantage of built-in register functionality, which also reduces size. Furthermore, ALU 200 exploits carry chain and cascade AND logic which requires no additional LUT or routing resources, nor relies on global interconnect, on certain programmable logic devices.

Figure 18:
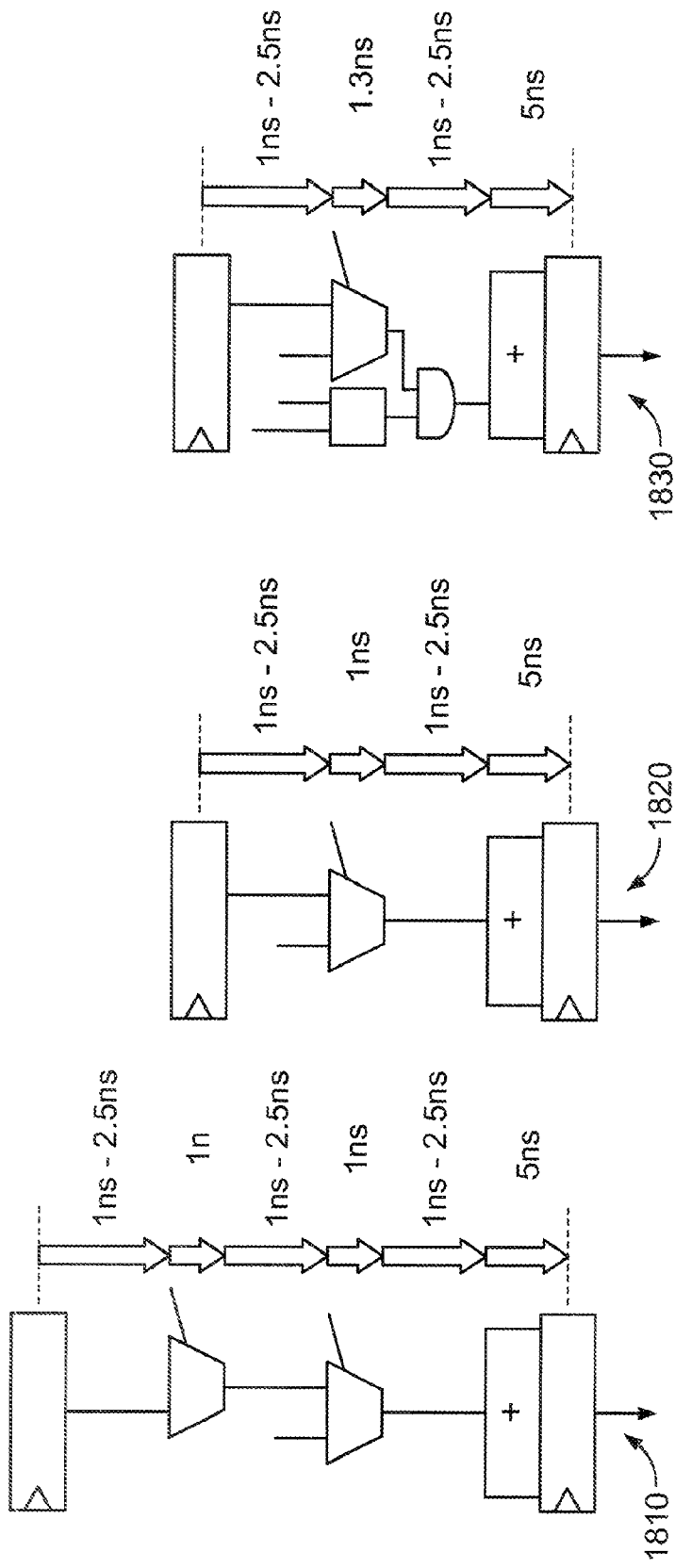
FIG. 18 is an illustration that compares routing delays in a convention ALU to routing delays in an ALU according to the invention.

FIG. 18 shows a comparison of the various circuitries' typical slowest path through an ALU in a particular device. The values shown in FIG. 18 are not meant to limit the invention to any particular values or ratio, but are merely illustrative of the advantages obtained by the invention, the associated routing delays, and the corresponding system capabilities. Element 1810 corresponds to routing delays for conventional ALUs. This circuit can run at system speeds of 69-100 MHz. Element 1820 corresponds to routing delays for ALUs according to the invention with just a single MUX between the operand register and the adder/register. This circuit can run at system speeds of 90-125 MHz. Element 1830 corresponds to routing delays for ALUs according to the invention with additional logic, such as cascade ANDS and/or carry chains between the operand register and the adder/register. This circuit can run at system speeds of 88-120 MHz. Thus, it is shown that ALU circuitry according to the invention is capable of running at substantially higher speeds than ALUs in the prior art.

In yet another embodiment of the invention, a barrel shifting functionality may be implemented in an ALU according to the invention. The advantage of a barrel shifter over a byte rotator is that a barrel shifter may be used to rotate the operand by less than a single byte. In fact, a barrel shifter may be used to rotate an operand by a half byte—i.e., four bits—or even by a single bit.

Furthermore, a barrel shifter may be used to perform logical shifts which shift the operand either to the left and then zero out the new right-hand most bits (or bytes), or to the right and then zero out the new left-hand most bits. Additionally, a barrel shifter may be sued to perform arithmetic shifts. Arithmetic shifts may be used to shift the operand to the right while filling in the newly-created left-hand most bits with the value that was previously providing the sign for the value. Thus, if the sign bit was a one (in twos complement, this signifies a negative bit) then the ones' value is extended for as many positions as the rotation allows. For example, if the shift was for three bytes to the right, and the sign of the original operand was negative, then the result would move the first byte of the operand three positions to the right, and then fill in the remaining left-hand most positions with ones.

The additional barrel shifting functionality is typically provided by rotating the operand and then masking the rotated operand as required. In the following written description, the operand A of the ALU heretofore described is rotated and then B is used to mask portions of the operand as required by the particular shift.

Figure 19:
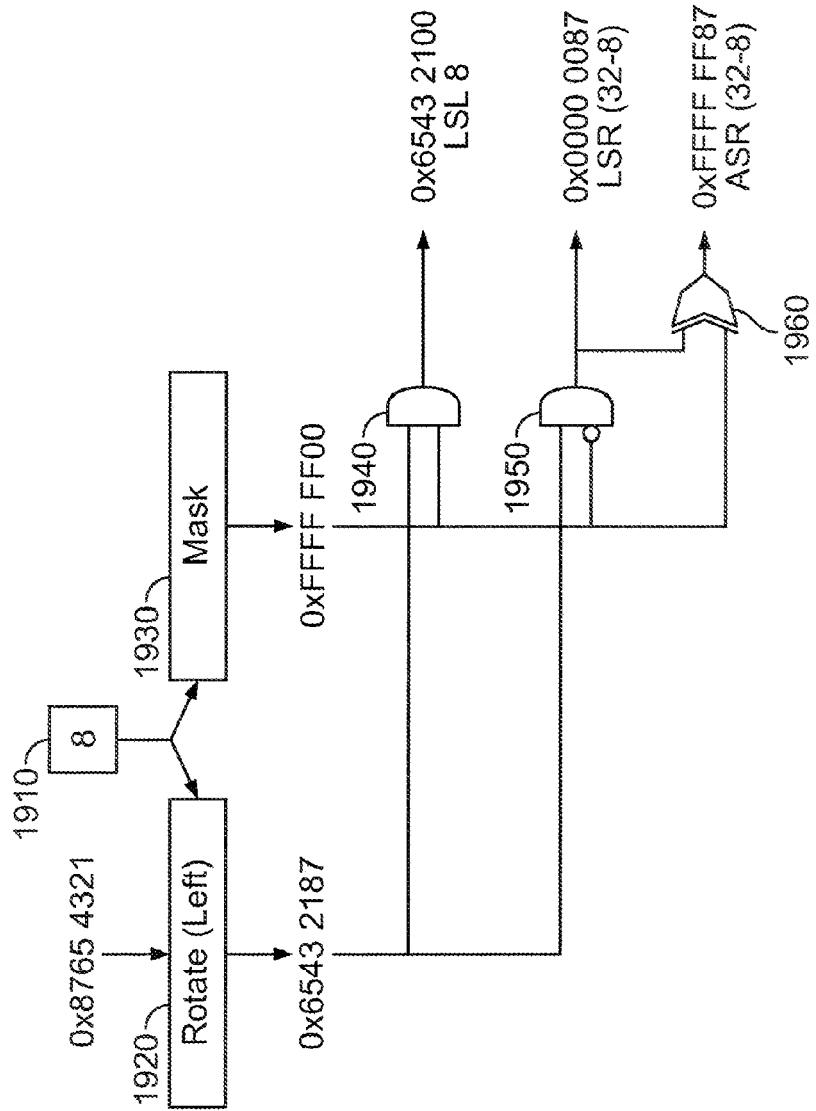
FIG. 19 shows a schematic diagram of a barrel shifter according to the invention.

FIG. 19 shows one possible masking scheme that may be used for three different exemplary barrel shifts. These barrel shifts are preferably implemented on a four-byte number.

An eight-bit indicator 1910 is input into both the rotation mechanism 1920 and the mask mechanism 1930. To perform a one-byte logical shift left, the one-byte left-shifted operand, 0x6543 2187, is input, together with the mask, 0xFFFF FF00, into AND gate 1940. The result includes the three previously right-hand most bytes being shifted to the left by one byte, and the new right-hand most byte being zeroed out by the mask.

To perform a three-byte logical shift right, the one-byte left-rotated operand (which is equivalent to a three-byte right-shifting the operand), is input, together with the mask, 0xFFFF FF00, into AND gate 1950 (which includes and inverter on the mask input). The result includes the original left-hand most byte, which has been shifted to the right three bytes. The result also includes zeroes in the remaining three left-hand most bytes as a result of the previously left-hand most byte being shifted to the right by three byte, and the new left-hand most three bytes being zeroed out by the mask.

Similar, but somewhat different, to the logical shift right is the arithmetic shift right. The arithmetic shift right takes the result of the logical shift right and inputs it into one input of XOR gate 1960. Then, the mask is input into the other input of XOR gate 1960. The result is that ones have been propagated in each of the three left-hand most bytes of the result instead of zeroes. This is because an arithmetic shift provides for extension of the sign bit according to the number of bits, or bytes, that the operand has been rotated. In this particular examples, the sign bit fills three bytes—the exact number of bytes that the operand has been rotated.

Figure 20:
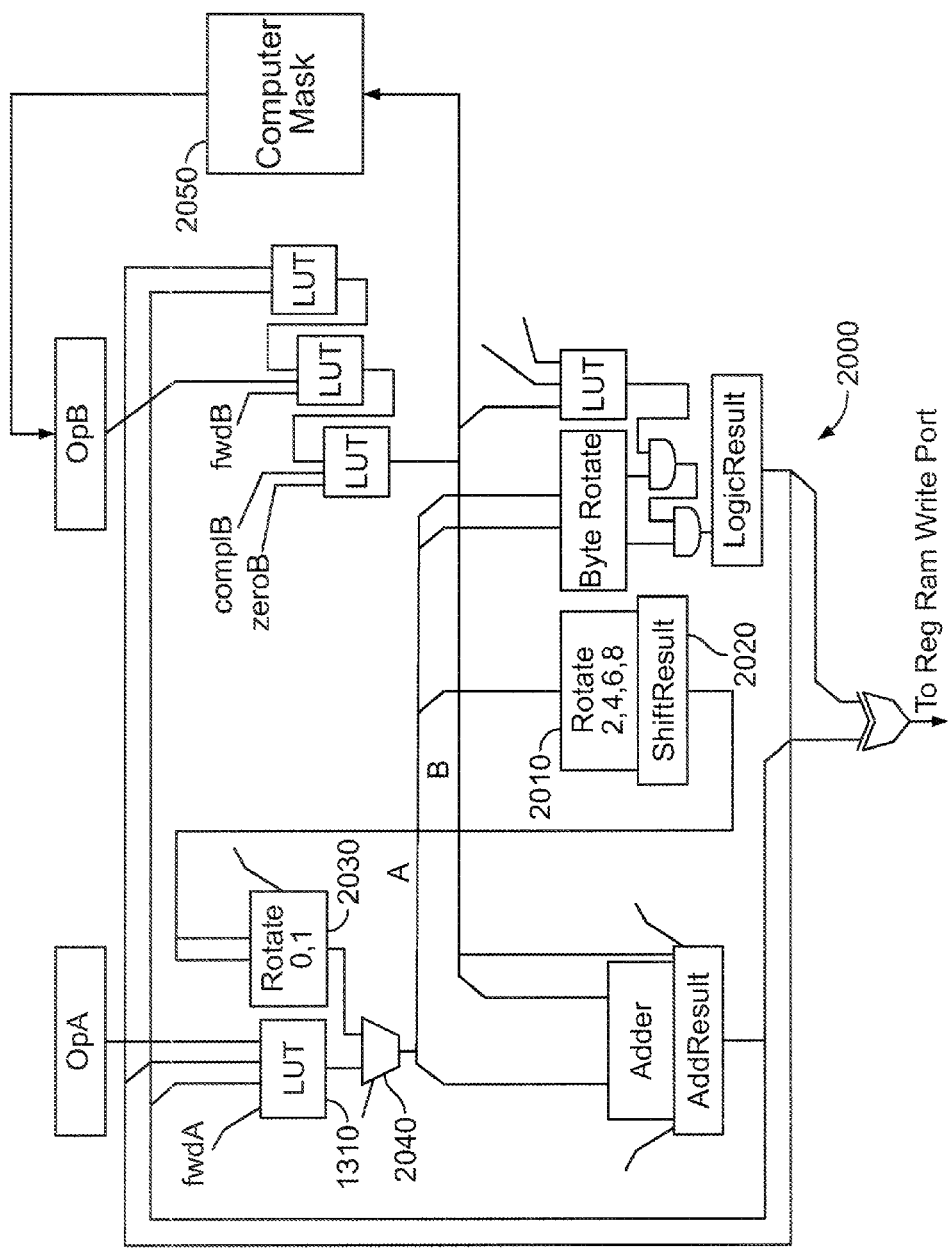
FIG. 20 shows a schematic diagram of an ALU implementing a barrel shifter according to the invention.

FIG. 20 shows a schematic diagram of an ALU 2000 according to the invention which implements barrel shifting circuitry. The barrel shifting circuitry preferably is used together with byte rotator 224 to implement a shift of any desired bit length of the value associated with operand A. Operand A is preferably input into rotator 2010. Rotator 2010 preferably implements a desired barrel shift and then transmits the result from the rotator 2010 into register 2020. Then, the result is transmitted to rotator 2030 which preferably adds a shift of finer granularity then rotator 2010, which preferably allows for fine shift—i.e., shifting of even one bit in either direction. Finally, the result from the rotator 2030 is fed in MUX 2040 in order that the shifted value may be selected, when desired, to be used for operand A.

Additionally, a mask may be computed using block 2050. The computed mask may then be substituted for operand B, as required for operation of the barrel shifter.

Figure 21:
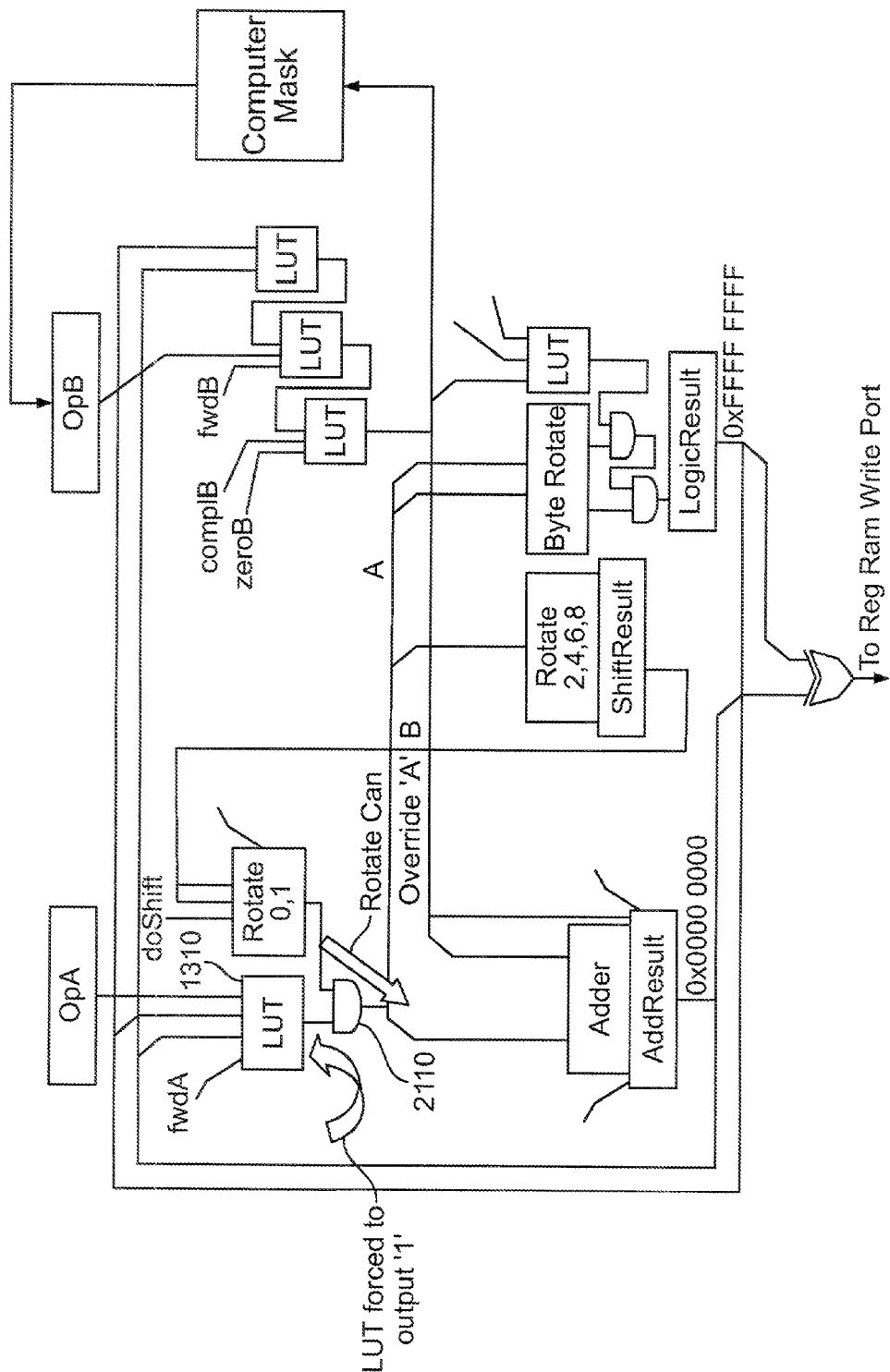
FIG. 21 shows another schematic diagram of an ALU implementing a barrel shifter according to the invention.

FIG. 21 shows one alternative embodiment of the barrel shifting. In the embodiment shown in FIG. 21, MUX 2040 has been substituted for by AND gate 2110. Cascade AND gate 2110 may be used when the output of LUT 1310 is forced to all ONEs. In this way, the routing delays associated with MUX 2040 may be substantially reduced. One way to force the output of LUT 1310 to all ONEs is to force the output of Add Result Register to all ZEROES and the output of Logic Result Register to all ONES. Furthermore, a one should preferably be input on fwdA line, and then, based on the logic in XOR 1210 that was incorporated into LUT 1310, the output of LUT 1310 should preferably be ZERO.

Figure 22:
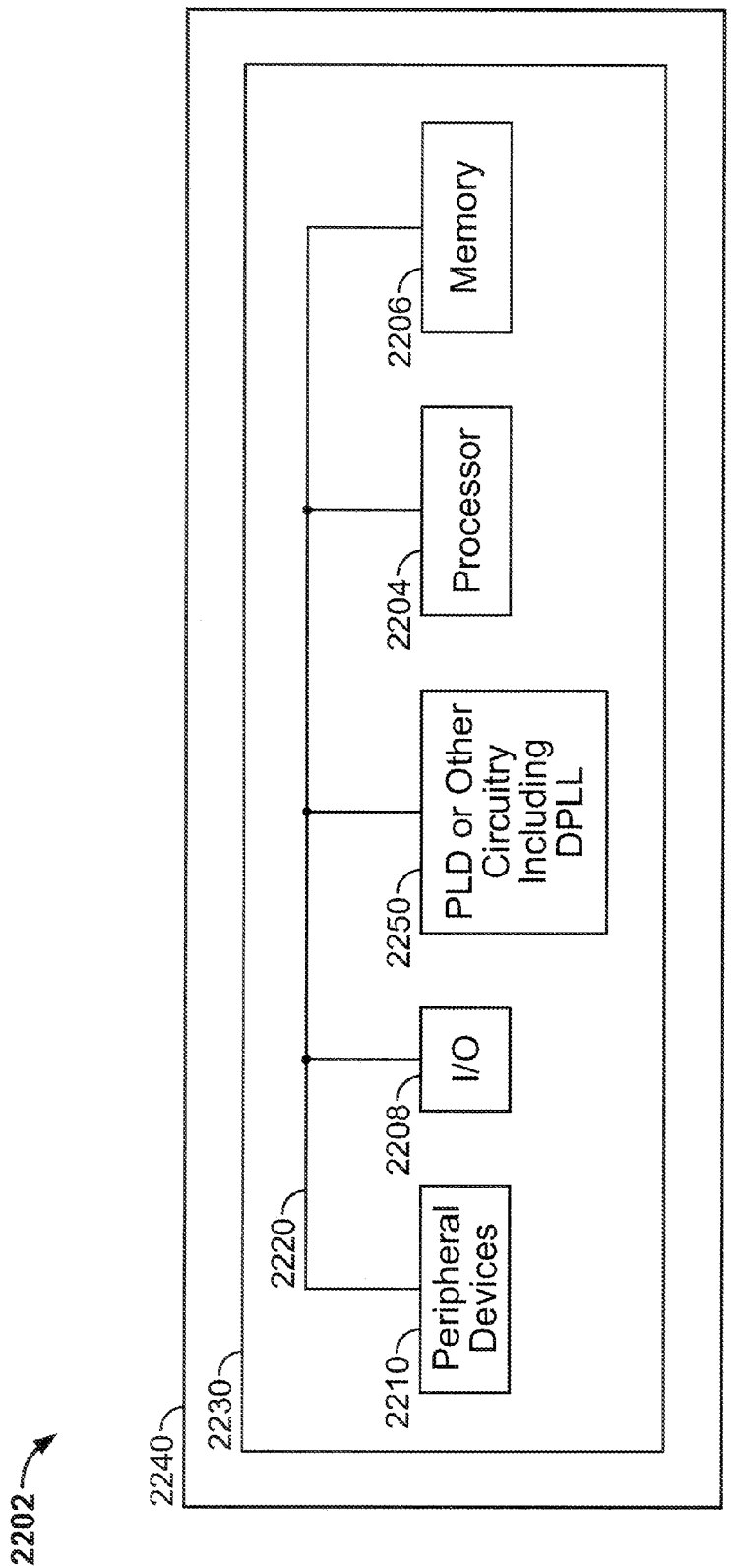
FIG. 22 is a simplified block diagram of an illustrative system employing circuitry in accordance with the invention.

FIG. 22 illustrates a PLD or other circuitry 2200 in a data processing system 2202 that may incorporate an ALU in accordance with the invention. Data processing system 2202 may include one or more of the following components: a processor 2204; memory 2206; I/O circuitry 2208; and peripheral devices 2210. These components are coupled together by a system bus or other interconnections 2220 and are populated on a circuit board 2230 (e.g., a printed circuit board), which is contained in an end-user system 2240. Any of the interconnections between element 2250 and any other elements may be made in a manner known to one skilled in the art.

System 2202 can be used in a wide variety of applications, such as computer networking, data networking, instrumentation, video processing, digital signal processing, or any other application where the advantage of using programmable or reprogrammable logic is desirable. Circuitry 2250 can be used to perform a variety of different logic functions. For example, circuitry 2250 can be configured as a processor or controller that works in cooperation with processor 2204. Circuitry 2250 may also be used as an arbiter for arbitrating access to a shared resource in system 2202. In yet another example, circuitry 2250 can be configured as an interface between processor 2204 and one of the other components in system 2202. It should be noted that system 2202 is only exemplary, and that the true scope and spirit of the invention should be indicated by the following claims.

It will be understood that the foregoing is only illustrative of the principles of the invention, and that various modifications can be made by those skilled in the art without departing from the scope and spirit of the invention, and the present invention is limited only by the claims that follow.

What is claimed is:

1. An arithmetic logic unit comprising:
a first signal propagation path comprising:
a first four input look-up table configured to receive a first one of a plurality of operands; and
an adder register that is configured to receive a first output signal from the four input look-up table and coupled to provide a second output signal to a result register; and
a second signal propagation path comprising:
a carry chain configured to receive an input from a second one of the plurality of operands; and
a cascade AND chain configured to receive a third output signal from the carry chain and to provide a fourth output signal to another result register.

2. The arithmetic logic unit of claim 1, wherein the arithmetic logic unit is configured to implement addition functionality.

3. The arithmetic logic unit of claim 1, wherein the arithmetic logic unit is configured to implement subtraction functionality.

4. The arithmetic logic unit of claim 1, wherein the arithmetic logic unit is configured to implement exclusive OR functionality.

5. The arithmetic logic unit of claim 1, wherein the arithmetic logic unit is configured to implement byte rotator functionality.

6. The arithmetic logic unit of claim 1, wherein the arithmetic logic unit is configured to implement barrel shifter functionality.

7. The arithmetic logic unit of claim 1, wherein the carry chain comprises a plurality of logic elements configured to receive the input from the second one of the plurality of operands.

8. A printed circuit board on which is mounted the arithmetic logic unit as defined in claim 1.

9. The printed circuit board defined in claim 8 further comprising:
a memory mounted on the printed circuit board and coupled to the arithmetic logic unit.

10. The printed circuit board defined in claim 8 further comprising:
processing circuitry mounted on the printed circuit board and coupled to the arithmetic logic unit.

11. The arithmetic logic unit of claim 1, wherein the cascade AND chain comprises a plurality of look-up tables.

12. An arithmetic logic unit comprising:
a signal propagation path comprising:
at least a first stage implementing a carry chain to reduce routing delays;
at least a second stage implementing a cascade AND chain to reduce routing delays, wherein the second stage is coupled to an output signal from the first stage, wherein the cascade AND chain comprises a plurality of look-up tables, and wherein at least one of the look-up tables has an input coupled to the output signal from the first stage and an output coupled to a plurality of cascaded AND gates; and
wherein the arithmetic logic unit operates through two non-nearest neighbor routing delays to increase the performance of the arithmetic logic unit.

13. The arithmetic logic unit of claim 12, wherein the arithmetic logic unit is configured to implement addition functionality.

14. The arithmetic logic unit of claim 12, wherein the arithmetic logic unit is configured to implement subtraction functionality.

15. The arithmetic logic unit of claim 12, wherein the arithmetic logic unit is configured to implement exclusive OR functionality.

16. The arithmetic logic unit of claim 12, wherein the arithmetic logic unit is configured to implement byte rotator functionality.

17. The arithmetic logic unit of claim 12, wherein the arithmetic logic unit is configured to implement barrel shifter functionality.

18. A printed circuit board on which is mounted the arithmetic logic unit as defined in claim 12.

19. The printed circuit board defined in claim 18 further comprising:
a memory mounted on the printed circuit board and coupled to the arithmetic logic unit.

20. The printed circuit board defined in claim 18 further comprising:
processing circuitry mounted on the printed circuit board and coupled to the arithmetic logic unit.

* * * * *